(12) United States Patent
Jo

(10) Patent No.: US 12,423,681 B2
(45) Date of Patent: Sep. 23, 2025

(54) CRYPTOCURRENCY HARDWARE WALLET ON MONOLITHIC CHIP WITH COMMON PHYSICAL COUNTERMEASURES AND SECURE MEMORY

(71) Applicant: Crossbar, Inc., Santa Clara, CA (US)

(72) Inventor: Sung Hyun Jo, Sunnyvale, CA (US)

(73) Assignee: CrossBar, Inc., Santa Clara, CA (US)

( * ) Notice: Subject to any disclaimer, the term of this patent is extended or adjusted under 35 U.S.C. 154(b) by 0 days.

(21) Appl. No.: 18/406,899

(22) Filed: Jan. 8, 2024

(65) Prior Publication Data

US 2025/0225507 A1     Jul. 10, 2025

(51) Int. Cl.
  G06Q 20/00     (2012.01)
  G06Q 20/36     (2012.01)

(52) U.S. Cl.
  CPC ................ G06Q 20/3678 (2013.01)

(58) Field of Classification Search
  CPC ................................. G06Q 20/3678
  USPC ................ 705/16, 21, 59; 380/44, 262
  See application file for complete search history.

(56) References Cited

U.S. PATENT DOCUMENTS

2016/0343937 A1   11/2016   Jo
2020/0301408 A1*   9/2020   Elbsat ............... G06N 3/04
2023/0317162 A1   10/2023   Nazarian

FOREIGN PATENT DOCUMENTS

WO   2022/150617   7/2022
WO   2023/219787   11/2023

OTHER PUBLICATIONS

European Search report for European Patent Application No. 25150594.7, dated Jun. 4, 2025, 14 pages long.
"Blockchain and distributed ledger technologies—Security management of digital asset custodians", ISO Technical Report, Dec. 1, 2020 (Dec. 1, 2020), 12 pages.
A. Rukhin et al.: "A Statistical Test Suite for Random and Pseudorandom Number Generators for Cryptographic Applications", NIST, vol. 800-22, 2010, 131 pages.

* cited by examiner

*Primary Examiner* — Dante Ravetti
(74) *Attorney, Agent, or Firm* — Wegman, Hessler Valore

(57) ABSTRACT

An electronic hardware wallet for conducting cryptocurrency transactions, blockchain transactions, or other secure communications is embodied on a monolithic integrated circuit (IC) die supported on a single substrate. The monolithic semiconductor device can include a non-volatile data store for storing application software executable by the multi-core processor, and the secure element can include a secure data store for storing secret data (e.g., a private key) for use in a secure electronic transaction. In some embodiments, the secure element can include hardware logic embodying a cryptocurrency algorithm associated with executing the secure electronic transaction and can have a limited and selective communication bus between the secure element and the multi-core processor. The electronic hardware wallet can communicatively couple with one or more other devices to facilitate a multi-party computation (MPC) algorithm for authenticating the cryptocurrency algorithm and validating the secure electronic transaction.

7 Claims, 12 Drawing Sheets

CRYPTOCURRENCY HARDWARE WALLET ON MONOLITHIC CHIP WITH COMMON PHYSICAL COUNTERMEASURES AND SECURE MEMORY

INCORPORATION BY REFERENCE

U.S. patent application Ser. No. 13/673,951 filed Nov. 9, 2012 and titled "SECURE CIRCUIT INTEGRATED WITH MEMORY LAYER", U.S. patent application Ser. No. 17/223,817 filed Apr. 6, 2021 and titled "DISTINCT CHIP IDENTIFIER SEQUENCE UTILIZING UNCLONABLE CHARACTERISTICS OF RESISTIVE MEMORY ON A CHIP", U.S. patent application Ser. No. 18/200,318 filed May 22, 2023 and titled "UTILIZING TWO-TERMINAL RESISTIVE SWITCHING MEMORY TO STORE VALIDATION DATA OF AN INTEGRATED CIRCUIT DEVICE", and U.S. patent application Ser. No. 18/218,948 filed Jul. 24, 2023 and titled "SECURE MICROCONTROLLER WITH UNIFIED RRAM AND SUB-MODULE ADDRESSING AND ACCESS CONTROL", are hereby incorporated by reference herein in their respective entireties and for all purposes.

TECHNICAL FIELD

The subject disclosure relates generally to semiconductor devices facilitating secure transactions, and as one illustrative example, a cryptocurrency hardware wallet formed on a single substrate monolithic die with secure memory and common physical countermeasures.

BACKGROUND

Security in electronic communication is relevant at micro and macro scales, from operations of components within a single die to network communications of communicatively interconnected computing devices. Moreover, communication security is relevant at various scales in between the micro and macro levels, as well as for unconventional (or even heretofore unknown) inter-operations of electronic devices. Although variations exist, probably the most common application in the modern context for securing electronic communication is with cryptographic algorithms.

As a general characteristic, cryptographic algorithms tend to leverage highly complex computational schemes that make breaking the algorithm practically impossible, though in most cases not theoretically impossible. The greater the complexity of the cryptographic algorithm the more practical difficulty in breaking it. For this statement to be true, however, certain mathematical assumptions that the algorithm relies upon must also hold true. One such assumption is the true randomness of a numbering scheme leveraged by an algorithm. Where systematic patterns exist within the numbering scheme or the mechanism utilized to generate (random) numbers, an algorithm is more vulnerable to being compromised. To this end, the national institute on standards and technology (NIST) maintains tests for randomness of number generators for use in cryptography applications (see, e.g., A. Rukhin, et al., "A Statistical Test Suite for Random and Pseudorandom Number Generators for Cryptographic Applications", NIST, vol. 800-22, no. rev 1a, p. 131, 2010).

One potential vulnerability for secure communications is memory utilized to store secure data. Hacking techniques can leverage knowledge about how a memory operates at a cell or array level, how a memory stores bits of data, physical effects of operations of the memory and so forth to infer information about secure data stored in the memory. Such knowledge rarely yields the secure data in and of itself. However, even where only minor correlation about some bits of the stored data can be correctly inferred, the theoretical or mathematical security of stored data can be undermined. This in turn can reduce the difficulty of compromising the secure data by brute force calculations or other conventional means.

In addition to confidence in storing secure data, the inventor of the present application has proposed techniques for generating data with memory elements. For instance, stochastic characteristics of resistive-switching structures have been proposed by the inventor as suitable for generating non-correlated data for random number generation, or similar applications. Each of these applications has met different needs for electronic memory applications or specialty data generation applications.

In light of the above, the Assignee of the present disclosure continues to develop and pursue practical utilizations of integrated circuit devices for secure communications.

SUMMARY

The following presents a simplified summary of the specification in order to provide a basic understanding of some aspects of the specification. This summary is not an extensive overview of the specification. It is intended to neither identify key or critical elements of the specification nor delineate the scope of any particular embodiments of the specification, or any scope of the claims. Its purpose is to present some concepts of the specification in a simplified form as a prelude to the more detailed description that is presented in this disclosure.

The present disclosure provides an electronic hardware device for secure transactions. An example application of such a device is an electronic hardware wallet for conducting cryptocurrency transactions, blockchain transactions, or other secure communications. In one or more disclosed embodiments, the electronic hardware includes a multi-core processor and a secure element formed in a monolithic semiconductor device on a single substrate. The monolithic semiconductor device can include a non-volatile data store for storing application software executable by the multi-core processor, and the secure element can include a secure data store for storing secret data (e.g., a private key) for use in a secure electronic transaction. In some embodiments, the secure element can include hardware logic embodying a cryptocurrency algorithm associated with executing the secure electronic transaction.

While a cold hardware wallet is generally understood as storage-only and having no electronic communication ability, a hot hardware wallet has internet connectivity to connect with a server device for conducting blockchain transactions. In contrast to these, a limited hot hardware wallet as utilized herein can have protected electronic communication capabilities to facilitate secure transactions as well as user convenience in implementing transactions with other parties. In some embodiments the protected electronic communication can be limited to direct physical interface, or indirect physical interface (e.g., wired interface). In other embodiments, the protected electronic communication can include a short-range only secured wireless communication, or can include a dedicated communication link with a server device.

In additional embodiments, the present disclosure provides a method for authenticating a cryptocurrency transaction. The method can comprise forming a short-range only communication link between a secure device and an electronic device. In one or more embodiments, the secure device can be embodied exclusively within a monolithic chip formed on a single substrate. The method can further comprise initiating a multi-party computation (MPC) algorithm with the electronic device and with a server device communicatively connected to the electronic device by way of a second communication link. Further, the method can comprise determining a result of the MPC algorithm utilizing a plurality of: a first secret input stored within a secure element of the secure device, a second secret input supplied by the electronic device over the short-range only communication or a third secret input received from the server device at the electronic device over the second communication link and supplied by the electronic device over the short-range only communication. Still further, the method can comprise at least one of: activating the cryptocurrency transaction in response to the result of the MPC algorithm being a valid authentication result, or rejecting the cryptocurrency transaction in response to the result of the MPC algorithm being an invalid authentication result.

According to further embodiments of the present disclosure, there is disclosed a secure cryptocurrency wallet device. The secure cryptocurrency wallet device can comprise a multi-core processor embodied in logic formed on a single substrate of a monolithic semiconductor die, and a first two-terminal non-volatile memory communicatively coupled to the multi-core processor. Moreover, the secure cryptocurrency wallet device can comprise hardware logic formed on the single substrate of the monolithic semiconductor die that embodies a cryptocurrency algorithm. In one or more embodiments, operation of the hardware logic can execute the cryptocurrency algorithm. Additionally, the secure cryptocurrency wallet device can comprise a selective data bus that couples the multi-core processor with the hardware logic enabling a process executed by the multi-core processor or a core of the multi-core processor to issue a command to the hardware logic to initiate operation of the hardware logic. Further, the secure cryptocurrency wallet device can comprise a secure communication interface that facilitates secure electronic communication between the multi-core processor of the monolithic semiconductor die and an external electronic device.

According to additional embodiments of the present disclosure, there is disclosed a method for fabricating a cryptocurrency hard wallet device. The method can comprise: form, on a substrate of a monolithic integrated circuit (IC) die, a processing logic. Further, the method can comprise: form a first non-volatile filamentary switching memory within the monolithic IC die and overlying the substrate and provide a direct bus between the processing logic and the first non-volatile filamentary switching memory. Additionally, the method can comprise: form a secure element on the substrate. Forming the secure element can further comprise: form a hardware logic encoded to execute a cryptographic algorithm, form a second non-volatile filamentary switching memory within the monolithic IC die and overlying the substrate and form a second direct bus between the hardware logic and the second non-volatile filamentary switching memory. In addition to the foregoing, the method can comprise: provide a controlled and limited bus between the processing logic and the secure element, and encapsulate the monolithic IC device as a discrete IC die.

The following description and the drawings set forth certain illustrative aspects of the specification. These aspects are indicative, however, of but a few of the various ways in which the principles of the specification may be employed.

Other advantages and novel features of the specification will become apparent from the following detailed description of the specification when considered in conjunction with the drawings.

BRIEF DESCRIPTION OF THE DRAWINGS

Various aspects or features of this disclosure are described with reference to the drawings, wherein like reference numerals are used to refer to like elements throughout. In this specification, numerous specific details are set forth in order to provide a thorough understanding of this disclosure. It should be understood, however, that certain aspects of the subject disclosure may be practiced without these specific details, or with other methods, components, materials, etc. In other instances, well-known structures and devices are shown in block diagram form to facilitate describing the subject disclosure.

DETAILED DESCRIPTION

Introduction

Figure 1:
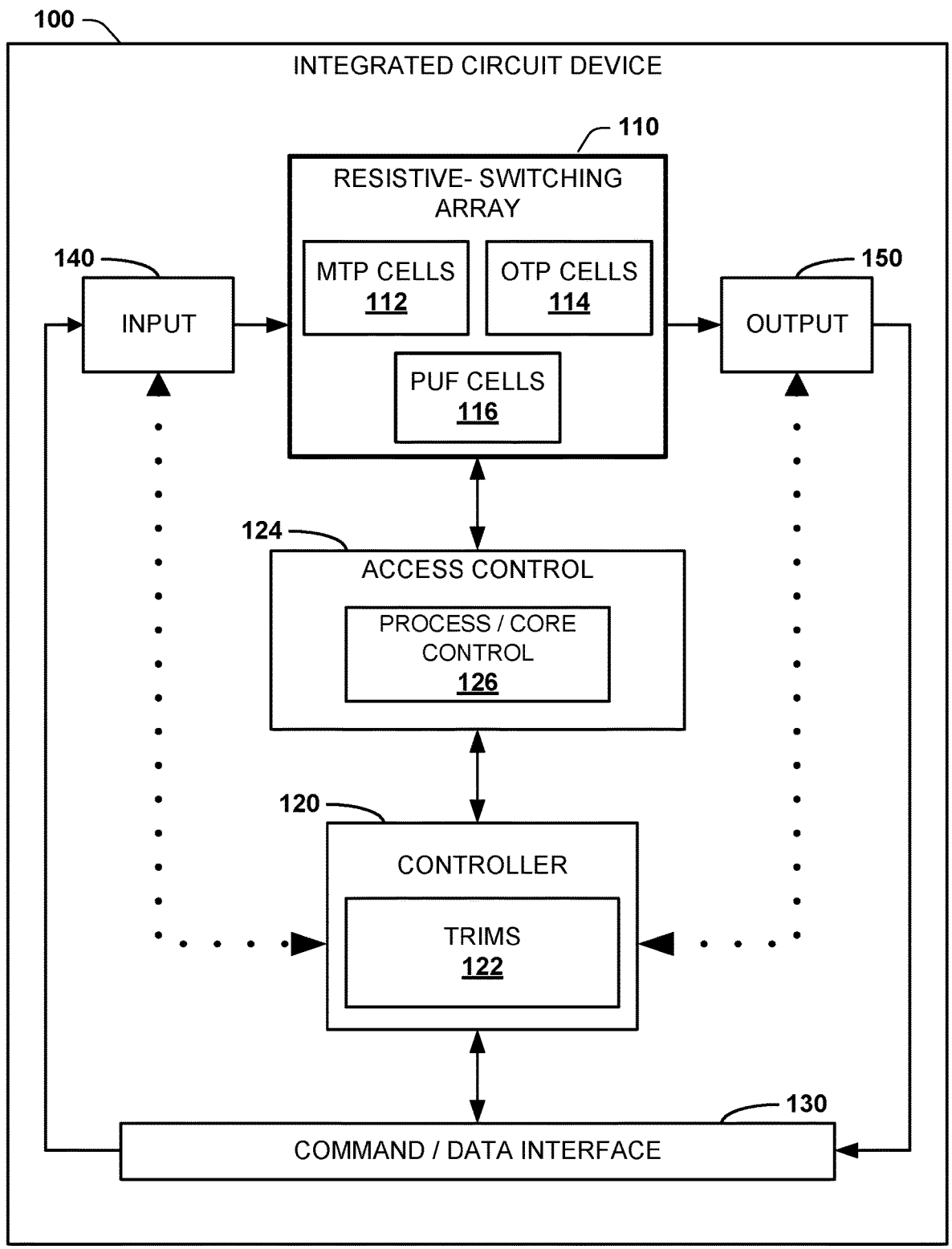
FIG. 1 illustrates a block diagram of an example integrated circuit (IC) device formed on a monolithic semiconductor die according to aspects of the disclosed embodiments.

Threats to security and validity of electronic devices by way of hacking and illicit access are widespread. Mechanisms to secure and authenticate an electronic device and inter-device network communication include cryptography, virtual private networking, combinations of these and others. In the event that electronic devices engaged in network communication are properly authenticated, the communication channel between the devices may still be vulnerable. This is often addressed by encrypting data before transmitting important communications onto a network. Virtual private networks (VPNs) can utilize a tunneling protocol, which can include encryption, between an electronic device and a communication network, between two networks, and so forth. But hacking efforts continue to identify and exploit weaknesses in security of electronic devices and electronic communications.

To illustrate, illicit modification or substitution of a component of an electronic device (e.g., a nonvolatile memory, a firmware, an encryption key, etc.), can effectively compromise the electronic device itself. Moreover, internal device packaging that provides communication between fabricated components that constitute an electronic device (e.g., inter-chip bonding that also facilitates inter-chip communication, or conventional printed circuit board communication lines connecting chips, etc.) can be accessed illicitly to compromise communication within a device itself. Similarly, physical access to a chip can attempt to retrieve secret security data used to encrypt communications, thereby compromising those communications. Also, network communications can potentially be compromised by accessing components of a network, sub-components thereof, or the data transmitted therein. Several core deficiencies in electronic devices and electronic communication are often exploited to compromise security in digital transactions.

In one example, a secure element can be constructed to store secret data and implement cryptographic algorithms. The secure element can be utilized for cryptocurrency transactions, blockchain transactions, and the like. However, while the secure element can be constructed with a set of physical countermeasures (PCMs) against hacking—also referred to as a PCM shield—communications to and from the secure element may not be shielded (e.g., see FIG. 6, infra). If a controller or processing device accessing the secure element is unprotected by the PCM shield, the controller becomes a point of vulnerability. In addition, if a communication link between the secure element and controller is not protected or covered by the PCM shield, data transport on the communication link can also be a point of weakness (even if the processing device has separate physical countermeasures, security, and the like).

In addition to the foregoing, the secure element itself can have outdated cryptographic algorithms with fixed functionality, difficult to update in response to newly developed security patches. Moreover, legacy secure element devices can be built upon traditional cryptographic primitives of the National Institute on Standards and Technology (NIST) that arguably incorporate potential backdoors, or at least inherent vulnerabilities. Furthermore, both secure element devices and associated processing devices often incorporate inferior non-volatile memory structures subject to a variety of physical access and hardware hacking. From a utility standpoint, many of these conventional memory structures—though inexpensive—have short shelf life and provide limited value in cryptocurrency long-term "savings" applications. Further, many secure element devices suffer from archaic single-key security architectures and do not have the computational capacity or memory to take advantage of sophisticated architectures such as multi-party computation (MPC). Single-key security also imposes a threat of asset loss through loss of a security key, or electronic device storing the security key with very limited and primitive backup mechanisms. Embodiments of the present disclosure address many of these deficiencies.

Devices and methods for furthering security in electronic devices and cryptocurrency transactions-such as digital asset exchange transactions, a digital signature validation transaction(s), and so forth—blockchain asset management structures, and the like, are disclosed in various embodiments of the present disclosure. In some embodiments, disclosed is a limited hardware wallet device that incorporates a modern and flexible processor logic with a secure element in a monolithic integrated circuit (IC) chip (e.g., see FIGS. 1-5, infra). Processor logic can embody a multi-core processor enabled to execute many logic processes, or threads, concurrently. Moreover, a limited data bus between the multi-core processor and secure element can be configured to permit access to the secure element for some, but not all, cores of the multi-core processor or some, but not all, threads of the multi-core processor.

A disclosed monolithic IC chip can be configured to accomplish all communications between the processor logic and secure element within a robust PCM shield associated with the monolithic IC chip. Further, the secure element device can integrate cryptographic primitives that leverage advanced computational architectures as well as non-standardized (e.g., not published by a national standards organization) or custom algorithms. Full hardware acceleration can dramatically increase computational power as well as security, while maintaining flexibility of fully updatable software application code stored at rewritable memory also contained within the monolithic chip. Moreover, in one or more embodiments, the application code as well as secret storage hardware can incorporate two-terminal resistive switching technologies that have inherent resistance to physical hacking, significantly greater longevity and greater data retention. Accordingly, the various embodiments provide significant advantages in data security and cryptocurrency storage and transaction hardware.

In some aspects of the present disclosure, filamentary resistive switching nonvolatile memory can be utilized for secure storage of cryptocurrency assets and security in cryptocurrency transactions. In at least some embodiments, a non-volatile resistive memory (ReMEM) that leverages atomic-scale filament formation (and deformation) to define measurably distinct states can be employed to store or even generate such information. For instance, security data such as a security key, or portion of a security key in a multi-party communication (MPC) paradigm can be generated with highly stochastic characteristics of resistive memory cell structures. In at least some embodiments, the security data can be generated within ReMEM itself as part of a physical unclonable function (PUF) data generation process that leverages that stochastic characteristics to generate highly non-correlated (e.g., random) data. In addition to the foregoing, ReMEM can be highly resistant to physical hacking attempts (also called side-channel attacks) and PUF data generated and stored within ReMEM can meet or exceed very high standards of randomness, making brute force data hacking ineffective.

More generally, processes that employ stochastic physical characteristics of ReMEM memory cells to generate non-correlated data can also be referred to as physical unclonable function (PUF) processes, physically unclonable feature (also PUF) processes, physical(ly) unclonable features, or other suitable nomenclature. Data produced by such processes can be utilized as PUF data, but also as Root of Trust data or other secure validation data. Data derived from such stochastic physical characteristics are referred to herein as PUF data (or a PUF bit, or group of PUF bits, etc.) and generally involve a resistive switching cell process applied to one or more resistive switching cells that define a PUF bit(s) (e.g., see U.S. patent application Ser. No. 17/223,817 filed Apr. 6, 2021, incorporated by reference hereinabove). PUF data can be generated from a cell process(es) applied to native resistive switching memory cells (sometimes referred to as virgin resistive switching memory cells) that have not had a memory process previously applied to those memory cells, following manufacture. Example memory processes can include a forming process (e.g., comprising one or more electrical forming pulses), a program process (e.g., comprising one or more electrical program pulses), an erase process (e.g., comprising one or more electrical erase pulses), an overwrite process, and so forth. In addition, PUF data generated from non-volatile resistive switching memory cells can thereafter be stored and read from at least a subset of the non-volatile resistive switching memory cells utilized to generate the PUF data. In at least some disclosed embodiments, a PUF generation process can be rendered permanent through a one-time programmable process(es) applied to a bit that becomes programmed in response to the PUF generation process, and that defines a PUF bit or a portion of a PUF bit (e.g., as in the case of a differential PUF bit in which respective states of multiple memory cells, in combination, define a data value for the PUF bit).

As utilized herein, the term "native", "original", "virgin" or the like refers to post-fabrication but pre-commercial operation of resistive switching devices on a semiconductor die. Native (and like terminology) need not exclude some or all post-fabrication operations such as quality testing or other verification routines performed by a manufacturer, and even some pre-commercial operation by a non-manufacturer such as testing to ensure manufacturer quality specifications are met by a chip, chip setup routines or configuration routines (e.g., defining one-time programmable memory or identifier memory within an array of resistive switching memory), among others. In general, a resistive switching device is in a native state, as utilized herein, if it has not yet received a stimulus (e.g., electrical, thermal, magnetic, or a like stimulus known in the art, suitable combinations thereof, and so forth) suitable to form a conductive filament within the resistive switching device and change the resistive switching device from an electrically resistive state to an electrically conductive state as described herein or known in the art.

As the name implies, a two-terminal resistive switching device has two terminals or electrodes. Herein, the terms "electrode" and "terminal" are used interchangeably. Generally, a first electrode of a two-terminal resistive switching device is referred to as a "top electrode" (TE) and a second electrode of the two-terminal resistive switching device is referred to as a "bottom electrode" (BE), although it is understood that electrodes of two-terminal resistive switching devices can be according to any suitable arrangement, including a horizontal arrangement in which components of a memory cell are (substantially) side-by-side rather than overlying one another. Between the TE and BE of a two-terminal resistive switching device is typically an interface layer sometimes referred to as a switching layer, a resistive switching medium (RSM) or a resistive switching layer (RSL); such devices are not limited to these layers, however, as one or more barrier layer(s), adhesion layer(s), ion conduction layer(s), seed layer(s), particle source layer(s) or the like—as disclosed herein, disclosed within a publication incorporated by reference herein, as generally understood and utilized in the art or reasonably conveyed to one of ordinary skill in the art by way of the context provided herein and its addition to the general understanding in the art or the incorporated publications—may be included between or adjacent one or more of the TE, the BE or the interface layer consistent with suitable operation of such device.

Composition of memory cells, generally speaking, can vary per device with different components, materials or deposition processes selected to achieve desired characteristics (e.g., stoichiometry/non-stoichiometry, volatility/non-volatility, on/off current ratio, switching time, read time, memory durability, program/erase cycle, and so on). One example of a filamentary-based resistive switching device can comprise: a conductive layer (e.g., a metal, metal-alloy, metal-nitride such as: TiN, TaN, TiW, or the like, or other suitable metal compounds), an optional interface layer (e.g., doped p-type (or n-type) silicon (Si) bearing layer such as: a p-type or n-type Si bearing layer, p-type or n-type polysilicon, p-type or n-type polycrystalline SiGe, etc.), a resistive switching layer (RSL) and an active metal-containing layer capable of being ionized. Under suitable conditions, the active metal-containing layer can provide filament-forming ions to the RSL. In such embodiments, a conductive filament (e.g., formed by the ions) can facilitate electrical conductivity through at least a subset of the RSL, and a resistance of the filament-based device can be determined, as one example, by a tunneling resistance between the filament and the conductive layer. A memory cell having such characteristics may be described as a filamentary-based device.

For disclosed resistive switching filamentary-based devices, completion of a conductive filament can involve only a few particles (e.g., atoms, ions, conductive compounds, etc.) of conductive material, or less. As one particular example, an electrically continuous conductive filament could be established by position of 1-3 atoms at a boundary of a switching layer, whereas repositioning of one or more of these atoms can break that electrical continuity, in some embodiments. Because the scale is so small between a completed filament and non-completed filament, illicit side-channel attempts to read bits of memory—for example through high resolution microscopy such as transmission electron microscopy (TEM)—can be very difficult, if not impossible due to the difficulty of imaging such small particles and determining whether their location is sufficient to establish electrical continuity. Still further, disclosed resistive switching devices can be formed among metal lines of a semiconductor chip (e.g., among backend-of-line wiring layers). The density of metal wiring layers further occludes visibility of the resistive switching devices, making common side-channel techniques unprofitable.

In one example, a disclosed filamentary resistive switching device comprises a particle donor layer (e.g., the active metal-containing layer) comprising a stoichiometric or non-stoichiometric metal compound (or mixture) and a resistive switching layer (which can also be stoichiometric, or non-stoichiometric). In one alternative embodiment of this example, the particle donor layer comprises a metal-nitrogen: $MN_x$, e.g., $AgN_y$, $TiN_x$, $AlN_x$, etc., and the resistive switching layer comprises a metal-nitrogen: $MN_y$, e.g., $AgO_y$, $TiO_y$, $AlO_y$, and so forth, where y and x are positive numbers (or ranges), and in some cases y is larger than x. In an alternative embodiment of this example, the particle donor layer comprises a metal-oxygen: $MO_x$, e.g., $AgO_x$, $TiO_x$, $AlO_x$, $HfO_x$, $TaO_x$ and so on, and the resistive switching layer comprises a metal-oxygen: $MO_y$, e.g., $AgO_y$, $TiO_y$, $AlO_y$, $HfO_y$, $TaO_y$ or the like, where y and x are positive numbers (or ranges), and in some cases y is larger than x. In yet another alternative, the metal compound of the particle donor layer is a $MN_x$ (e.g., $AgN_x$, $TiN_x$, $AlN_x$, etc.), and the resistive switching layer is selected from a group consisting of $MO_y$ (e.g., $AgO_y$, $TiO_y$, $AlO_y$, etc.) and $SiO_y$, where x and y are typically non-stoichiometric values, or vice versa in a still further embodiment.

As utilized herein, variables x, y, a, b, and so forth representative of values or ratios of one element with respect to another (or others) in a compound or mixture can have different values (or ranges) suitable for respective compounds/mixtures, and are not intended to denote a same or similar value or ratio among the compounds. Mixtures can refer to non-stoichiometric materials with free elements therein—such as metal-rich nitride or oxide (metal-oxide/nitride with free metal atoms), metal-poor nitride or oxide (metal-oxide/nitride with free oxygen/nitrogen atoms)—as well as other combinations of elements that do not form traditional stoichiometric compounds as understood in the art.

As utilized herein, the term "substantially" and other relative terms or terms of degree (e.g., about, approximately, roughly, and so forth) are intended to have the meaning specified explicitly in conjunction with their use herein, or a meaning which can be reasonably inferred by one of ordinary skill in the art, or a reasonable variation of a specified quality(ies) or quantity(ies) that would be understood by one of ordinary skill in the art by reference to this entire specification (including the knowledge of one of ordinary skill in the art as well as material incorporated by reference herein). As an example, a term of degree could refer to reasonable manufacturing tolerances about which a specified quality or quantity could be realized with fabrication equipment. Thus, as a specific illustration, though non-limiting, for an element of a resistive switching device expressly identified as having a dimension of about 50 angstroms (A), the relative term "about" can mean reasonable variances about 50 A that one of ordinary skill in the art would anticipate the specified dimension of the element could be realized with commercial fabrication equipment, industrial fabrication equipment, laboratory fabrication equipment, or the like, and is not limited to a mathematically precise quantity (or quality). In other examples, a term of degree could mean a variance of +/−0-3%, +/−0-5%, or +/−0-10% of an expressly stated value, where suitable to one of ordinary skill in the art to achieve a stated function or feature of an element disclosed herein. In still other examples, a term of degree could mean any suitable variance in quality(ies) or quantity(ies) that would be suitable to accomplish an explicitly disclosed function(s) or feature(s) of a disclosed element. Accordingly, the subject specification is by no means limited only to specific qualities and quantities disclosed herein, but includes all suitable variations of a specified quality(ies) or quantity(ies) reasonably conveyed to one of ordinary skill in the art by way of the context disclosed herein.

Overview

FIG. 1 illustrates a block diagram of an example integrated circuit device 100 for an electronic device (e.g., a secure device, a digital hardware wallet, and the like) according to one or more embodiments of the present disclosure. Integrated circuit device 100 includes an array(s) 110 of two-terminal resistive-switching memory cells (though other magnetic switching or charge-trapping two-terminal memory cells can be utilized instead or in addition, in some disclosed embodiments). Array(s) 110 of memory can include resistive switching memory cells, and different portions of the resistive switching memory cells can be characterized for different memory or data generation functions. Example functions of resistive switching memory cells of array(s) 110 can include PUF data generation or storage, true random number generation (TRNG) or storage, one-time programmable (OTP) data storage and many-time programmable (MTP) data storage (also referred to as rewritable or program/erase). Different groups of memory cells of array(s) 110 are provided to implement these functions. Multiple resistive-switching memory cells can be aggregated to define a differential PUF bit (or TRNG bit), or a single cell can define a PUF bit (or TRNG bit) in other embodiments. Thus, depicted in FIG. 1 are PUF memory cells 116 (which can also include TRNG cells), OTP memory cells 114 as well as MTP or rewritable/reversibly programmable memory cells 112. Array(s) 110 of resistive-switching memory cells can be characterized for other types of memory cell functions not specifically depicted in FIG. 1, where suitable.

As shown, array(s) 110 of two-terminal resistive-switching memory cells can be a unified memory structure, whereas in other embodiments, a different array (having a distinct access control 124) can define separate memory cells. In yet another embodiment, each of MTP cells 112, OTP cells 114 and PUF cells 116 can be embodied in distinct resistive switching arrays having respective access controls 124. More generally, one or more of: PUF cells 116, OTP cells 114 and MTP cells 112 can be separate memory structures from array(s) 110 of memory. For example, OTP cells 114 can be located externally to array(s) 110 on a different portion of a monolithic semiconductor chip. Alternatively, in other embodiments, OTP cells 114 (or MTP cells 112, or PUF cells 116) can be at least in part included within array(s) 110 of memory. For instance, OTP cells 114 can be embodied as an array among a set of arrays that form array(s) 110 of two-terminal resistive-switching memory, a block of memory within such an array(s) 110, a set of pages within one or more blocks or arrays, or other suitable arrangement.

Access control 124 can be configured to limit access to array(s) 110 or portions of array(s) 110. In an embodiment, access control 124 can be implemented in conjunction with a bus providing electronic communication with an array(s) 110 of memory cells (e.g., see MCU bus 335 or SE bus 345 of FIG. 3, infra). Different buses can have different access control settings in various embodiments. For instance, access control 124 associated with an array(s) 110 of a disclosed secure element can have a core/process control 126 configured to limit a processor, a core of a processor, a process or thread running on a processor, or the like, which can access the array(s) 110 associated with the secure element. Another access control 124 associated with a bus facilitating electronic communication with an array(s) 110 for storing application code, or with a volatile memory for maintaining operating data of an application in execution, can have few or no core/process control 126 access restrictions for the processor(s), core(s), processes or process threads implemented within a monolithic semiconductor chip such as IC device 100. Access control 124 can also enforce access limitations to array(s) 110 for external commands or data received at a command/data interface 130 (see below).

Controller 120 is provided to perform operations on array(s) 110 of two-terminal resistive-switching memory cells. Suitable operations can include memory operations, such as reading data from, writing data to, overwriting data at, and so on, subsets of array(s) 110. Memory operations can include processes such as program (write), read, overwrite, erase, and so forth, suitable for operation of MTP cells 112, and operations to program (write) or read OTP cells 114. Still further, memory operations can include processes for generating PUF data on individual PUF cells 116, or on a group(s) of PUF cells 116 defining a differential PUF bit. Instructions for implementing memory operations according to the various characterizations can be stored in trim instructions 122. Memory cell operations can be implemented in response to a command from an external device (by way of command/data interface 130, for example), which can be implemented by a manufacturer post-fabrication of integrated circuit device 100, by a distributor or reseller of integrated circuit device 100 after fabrication, by an end-user as part of a chip calibration routine, or as a dynamic process during operation of integrated circuit device 100, according to various embodiments. As an illustrative example, a host device communicatively coupled to integrated circuit device 100 can issue a host command to generate PUF data. In various embodiments, trim instructions 122 can store protocols to implement memory operations for MTP cells 112, OTP cells 114 and PUF cells 116 consistent with those characterizations.

Also illustrated in integrated circuit device 100 is an input(s) 140 and output(s) 150. In some embodiments, input(s) 140 can include (or provide a pathway for) data to be stored within array(s) 110 of two-terminal resistive-switching memory cells, such as MTP cells 112 or OTP cells 114. Output(s) 150 can output data stored within resistive switching devices of array(s) 110. In some embodiments, output(s) 150 can output data that results from computations utilizing data stored in two-terminal resistive-switching memory cells, in further embodiments.

A command/data interface 130 is provided to receive memory commands from an external device and respond to those commands. Further, data to be written to array(s) 110 can be received by way of command/data interface 130, and data output from array(s) 110 can be provided over command/data interface 130. Command/data interface 130 can include a direct physical interconnect to an electronic device in one or more embodiments (e.g., see local only communication 744 of FIG. 7, infra).

Figure 2:
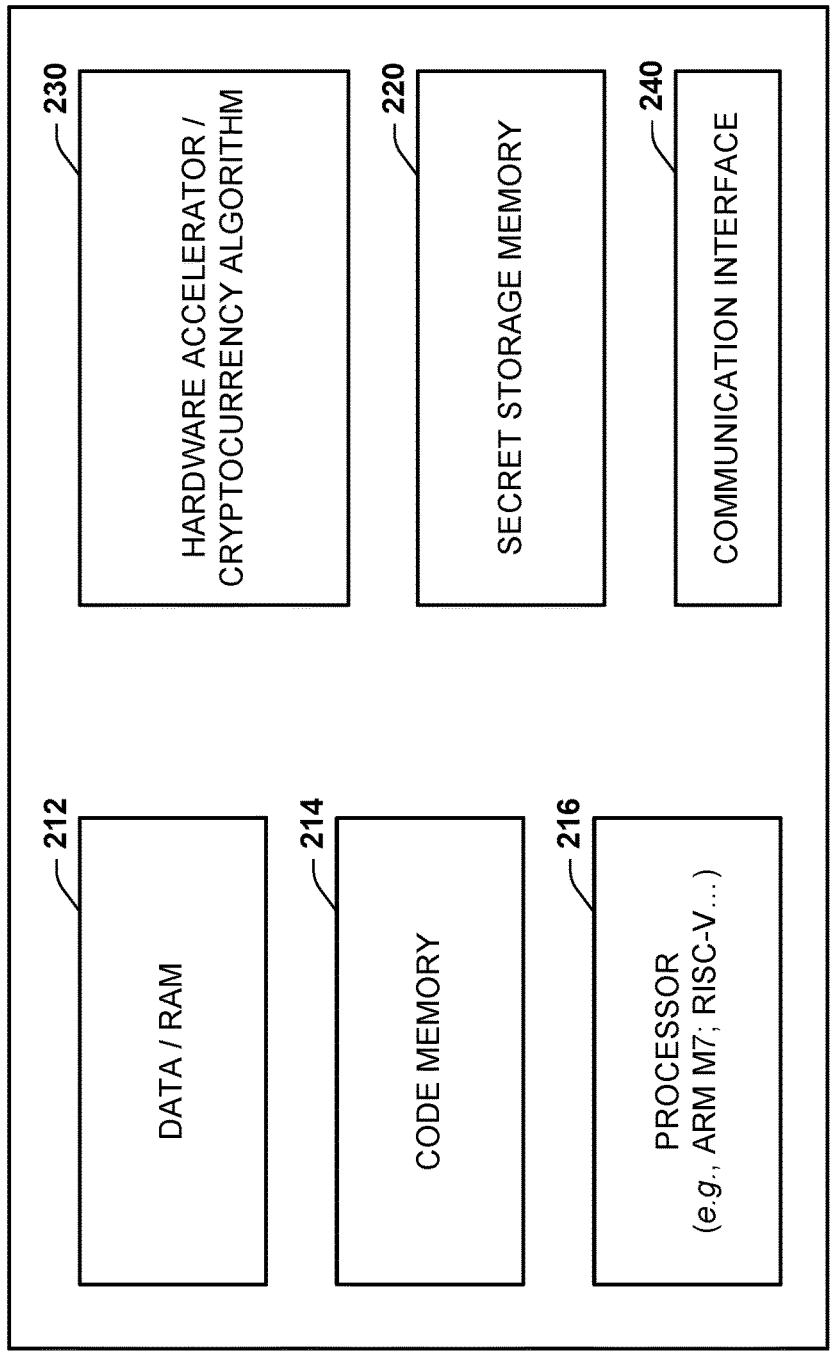
FIG. 2 depicts a block diagram of a sample cryptocurrency hard wallet device embodied in a single substrate monolithic IC device, in an embodiment(s)

FIG. 2 illustrates a block diagram of an example integrated circuit device 200 that can be embodied in a single monolithic chip, according to various aspects of the disclosed embodiments. Integrated circuit device 200 can be utilized in secure data storage and secure communication applications. As an example application, integrated circuit device 200 can be utilized as a cryptocurrency wallet device, and in a more specific example: a secure and limited crypto hot wallet device.

A cryptocurrency (or crypto) wallet can be generally understood as a device, a storage medium, a software, a service, or the like, or a suitable combination of the foregoing, which stores security information for cryptocurrency transactions. A crypto hot wallet device is a crypto wallet or component thereof that facilitates network communication in conjunction with cryptocurrency transactions, and is generally contrasted with a cold wallet that has no network communication capability and is used generally for storing security information for use in cryptocurrency transactions on another electronic device. A limited hot wallet as utilized herein can store security information, execute a cryptographic artifact exchange algorithm (or a portion thereof) involving exchange of a digital asset, exchange of authentication result data (e.g., MPC validation result of a digital signature, as one example) or the like, or facilitate a cryptocurrency transaction in conjunction with limited network communication capability. Examples of limited network communication capability can include network communication dependent on physical coupling with another suitable electronic device, dependent upon a wired network coupling with another device, dependent on a short range wireless network, dependent on a dedicated network communication, dependent on a virtual private network (VPN), or the like, or a suitable combination of the foregoing. A limited crypto hot wallet can provide a spectrum between (and a mixture of) the security available with a crypto cold wallet and the flexibility and convenience of a crypto hot wallet.

As introduced previously, integrated circuit device 200 can be embodied in a single monolithic chip built upon a single substrate in one or more disclosed embodiments. In such embodiments, integrated circuit device 200 and its components are formed from materials layered onto a substrate as part of a semiconductor wafer fabrication process that produces a die (or chip) having all hardware components formed integrally within the chip and on the substrate. Thus, processor 216, code memory 214, data/ram memory 212, hardware accelerator(s) 230, secret storage memory 220 or communication interface 240, or the like, or any suitable combination of the foregoing (included all of the foregoing) can be constructed on the substrate as part of monolithic fabrication of integrated circuit device 200. Monolithic integrated circuit fabrication has significantly reduced the production cost of electronic hardware. In addition, monolithic chips can be constructed to heighten security of the hardware components and the chip itself by locating communication pathways within an interior of the chip's physical structure (e.g., see U.S. patent application Ser. No. 13/673,951 incorporated by reference hereinabove). This can make access to intra-chip communication difficult, particularly where secure data or logic is vulnerable to destruction in response to techniques used to physically access the secure data or logic. Where secure data, secure communications and secure data processing are maintained within components of integrated circuit device 200, the overall security of that data and data processing can be enhanced over non-monolithic structures.

Integrated circuit device 200 can include a processor 216 that utilizes code memory 214 to store application instructions and data/RAM memory 212 for operating data in conjunction with execution of one or more applications at processor 216. Processor 216 can be embodied by a high capacity multi-core processor in one or more embodiments, including an ARM processor (e.g., ARM-7 or other iteration), a RISC processor (e.g., a RISC-V processor or other iteration), and so forth. Code memory 214 can be a non-volatile memory, such as a flash memory, or a resistive-switching memory (e.g., two-terminal filamentary memory, among others), magnetic switching memory (e.g., spin-transfer torque magnetic switching memory, etc.), or the like. In various embodiments, application instructions stored at code memory 214 can be updated to incorporate security updates, algorithm efficiency updates, and so forth. Moreover, new applications received at communication interface 240 by processor 216 can be stored at code memory 214, to facilitate provision of new software and applications for integrated circuit device 200. Accordingly, integrated circuit device 200 can have the increased flexibility of a network-capable electronic device that can be regularly updated by a user, reseller, or vendor post manufacture. Such updates can include software security and process updates, as well as the addition of new applications (and updates thereof).

Additionally, integrated circuit device 200 can comprise hardware accelerator(s) 230 providing hardware logic embodying one or more cryptographic algorithm(s). Hardware accelerator(s) 230 can comprise hardware-encoded logic configured to execute a particular cryptographic algorithm, in one or more disclosed embodiments. In further embodiments, hardware accelerator(s) 230 can comprise segments of hardware-encoded logic respectively configured to execute a portion of a cryptographic algorithm that, when executed in a suitable sequence, implement the cryptographic algorithm. Hardware encoding of hardware accelerator(s) 230 can be implemented primarily at manufacture. This makes algorithms executed by hardware accelerator(s) 230 largely immune to software-based malware, providing significant security for execution of the cryptographic algorithm(s) or portions thereof. In addition, hardware encoding can achieve processing times far faster than a software processor, in some cases up to 10× faster or even more. As a general characteristic then, hardware accelerator(s) 230 can significantly enhance both performance and security of computations performed at integrated circuit device 200.

Hardware-encoded logic segments of hardware accelerator(s) 230 can be referred to as atomic operations in one or more embodiments. These atomic operations can be executed independently to produce a result (e.g., a result of an atomic algorithm or of the atomic operation). Moreover, these atomic operations can also be combined (e.g., executed in a sequence) to produce another algorithm, which can be referred to herein by extending the atomic analogy as a molecular operation (combining multiple atomic operations). This other (molecular) algorithm is generally more complex as it combines multiple atomic operations. Moreover, atomic operations can be combined in different sequences to produce other (unique) molecular operations, different from the prior molecular operation. Accordingly, encoding a plurality of hardware-logic segments to realize a set of atomic operations can be leveraged by processor 216 to execute a fairly diverse set of algorithms, including cryptographic algorithms: such as a device authentication or validation algorithm(s), a user login authorization or validation algorithm, a cryptographic artifact exchange algorithm such as a digital asset exchange or exchange of authentication result data, a blockchain authentication or validation algorithm(s), secure authentication or validation algorithms, and so on.

Illustrative examples of algorithms that can be encoded into hardware accelerator(s) 230 can include public key signature algorithms, authentication and key derivation algorithms, key agreement algorithms, hash algorithms, encryption algorithms, secret sharing algorithms, homomorphic encryption algorithms, atomic acceleration for Zero Knowledge Proof (ZKP) algorithms, and the like, and suitable combinations of the foregoing. As further (but non-limiting) examples, public key signature algorithms can include Elliptic Curve Digital Signature Algorithm (ECDSA), Schnorr signature algorithm, Edwards-curve Digital Signature Algorithm (EdDSA), among others. Authentication and key derivation algorithms can include, among others: Hash-based Message Authentication Code (HMAC) and Password-Based Key Derivation Function 1 (PBKDF1) or PBKDF2. A suitable key agreement algorithm can be an Elliptic-Curve Diffie-Hellman (ECDH) algorithm, whereas suitable hash algorithms can include: Secure Hash Algorithm (SHA), SHA-0, SHA-1, SHA-2, SHA-3, Research and development in Advanced Communications technologies in Europe (RACE) Integrity Primitives Evaluation (RIPE) Message Digest algorithm (RIPEMD) 160 (RIPEMD-160), RIPEMD-256, RIPEMD-320, BLAKE2, BLAKE3, BLAKE-256, BLAKE-224, BLAKE-512, BLAKE-384, and so on. Still further, suitable encryption algorithms can include: Advanced Encryption Standard (AES), ChaCha20, Salsa20, Poly 1305, ChaCha20-Poly 1305, and so forth. Secret sharing algorithms can include: Shamir's Secret Sharing (SSS), Verifiable Secret Sharing (VSS), as well as others, and homomorphic encryption can include a Paillier cryptosystem, among others.

It should be appreciated that the above algorithms that can be encoded into hardware accelerator(s) 230 are only examples and are not intended to limit the algorithms or types of algorithms encoded by hardware accelerator(s) 230. Moreover, suitable atomic operations implementing a portion, subset, intermediary step, etc., of any of the above algorithms or other algorithms can be encoded into suitable segments of hardware accelerator(s) 230 that can execute the portion, subset, intermediary step, etc., of any suitable algorithm independently, in combination with other segments in a sequence, in combination with a first set of multiple segments in a sequence particular to an algorithm to effect executing that algorithm, in combination with a second set of multiple segments in a second sequence particular to a second algorithm to effect executing that second algorithm. In at least some embodiments, one or more segments of the first set of multiple segments can overlap with the second set of multiple segments; in still other embodiments, all segments of the first set of multiple segments can overlap the second set of multiple segments, and when executed in a second order different from the first order, effect the second algorithm.

Integrated circuit device 200 can comprise a secret storage memory 220. Secret storage memory 220 can contain secret data that can be utilized in conjunction with executing an algorithm at hardware accelerator(s) 230. In such embodiments, hardware accelerator(s) 230 can access secret storage memory 220 to retrieve the secret data in conjunction with executing a cryptographic algorithm, such as a device authentication or validation algorithm, a user login authorization or validation algorithm, a cryptocurrency algorithm, a blockchain authentication or validation algorithm, and so forth. In one or more embodiments, secret storage memory 220 can be accessed exclusively by hardware accelerator(s) 230. In such embodiments, processor 216 can provide an algorithm execution command(s) to hardware accelerator(s) 230 to execute an algorithm encoded within hardware accelerator(s) 230. Where needed to execute the algorithm execution command(s), hardware accelerator(s) 230 can then access secret storage memory 220 in conjunction with carrying out the algorithm execution command(s). In alternative or additional embodiments, a subset of data stored at secure storage memory 220 can be accessible by processor 216, whereas other data (e.g., secret data) can be accessed only by hardware accelerator(s) 230.

In alternative or additional embodiments, a communication bus (e.g., SE bus 345 of FIG. 3, infra) providing communication between processor 216 and hardware accelerator(s) 230 can be a limited communication bus, enabling selective communication between processor 216 and hardware accelerator(s) 230. Selective communication can permit one core of a multi-core processor to communicate with hardware accelerator(s) 230 and prevent a second core of the multi-core processor from such communication, permit one application executed by processor 216 to communicate with hardware accelerator(s) 230 and prevent a second application executed by processor 216 from such communication, or permit one process or thread executed by processor 216 to communicate with hardware accelerator(s) 230 and prevent a second process or thread from such communication, or the like, or a suitable combination of the foregoing.

In at least some embodiments, secret storage memory 220 can be a non-volatile memory, such as a flash memory, or a resistive-switching memory (e.g., two-terminal filamentary memory, magnetic switching memory, spin-transfer torque magnetic switching memory, etc.), or the like. In at least one embodiment, secret storage memory 220 can comprise physical unclonable function (PUF) memory that is utilized to generate secret data. In an embodiment(s), the PUF memory can be two-terminal filamentary resistive-switching memory utilized to generate the secret data utilizing a PUF write and optionally stored at the PUF memory in which the secret data is generated with the PUF write.

Still further, integrated circuit device 200 can comprise a communication interface 240 configured for carrying out electronic communications with a device(s) or network external to integrated circuit device 200. Communication interface 240 can be a hardware-only interface, in an embodiment, facilitating communication only with a device physically coupled to communication interface 240 (e.g., in which communication interface 240 comprises a set of electrical signaling contacts physically engaged with paired electrical signaling contacts of the physically coupled device), such as a serial interface, parallel interface, or other suitable direct electrical communication bus (e.g., PCIe, AGP, compute express link, and so on; see system 1208 of FIG. 12, infra). In other embodiments, communication interface 240 can be a wired interface facilitating communication only with a device physically coupled to communication interface 240 by a wired electronic communication interface (e.g., by way of a universal serial bus (USB) connection, an IEEE 1394 connection or variations and amendments thereof, an Ethernet connection, or other inline serial connection, parallel connection, and so forth). In still further embodiments, communication interface 240 can be a wireless interface that facilitates short range-only communication with an electronic device, such as a near-field communication (NFC) interface, a body area network (BAN) interface, a personal area network (PAN) interface, a near-me network interface, or the like, or a suitable combination of the foregoing. In still other embodiments, communication interface 240 can facilitate a wireless network with longer range (e.g., WiFi, cellular, municipal wireless, laser wireless network, etc.) to a cloud service, blockchain server, etc. In such case, the wireless network with longer range can have a dedicated data link to the cloud or blockchain server, a virtual private network (VPN) link to the cloud or blockchain server, or other tunneling protocol link to the cloud or blockchain server, or the wireless network can be a general data link in at least some embodiments.

Figure 3:
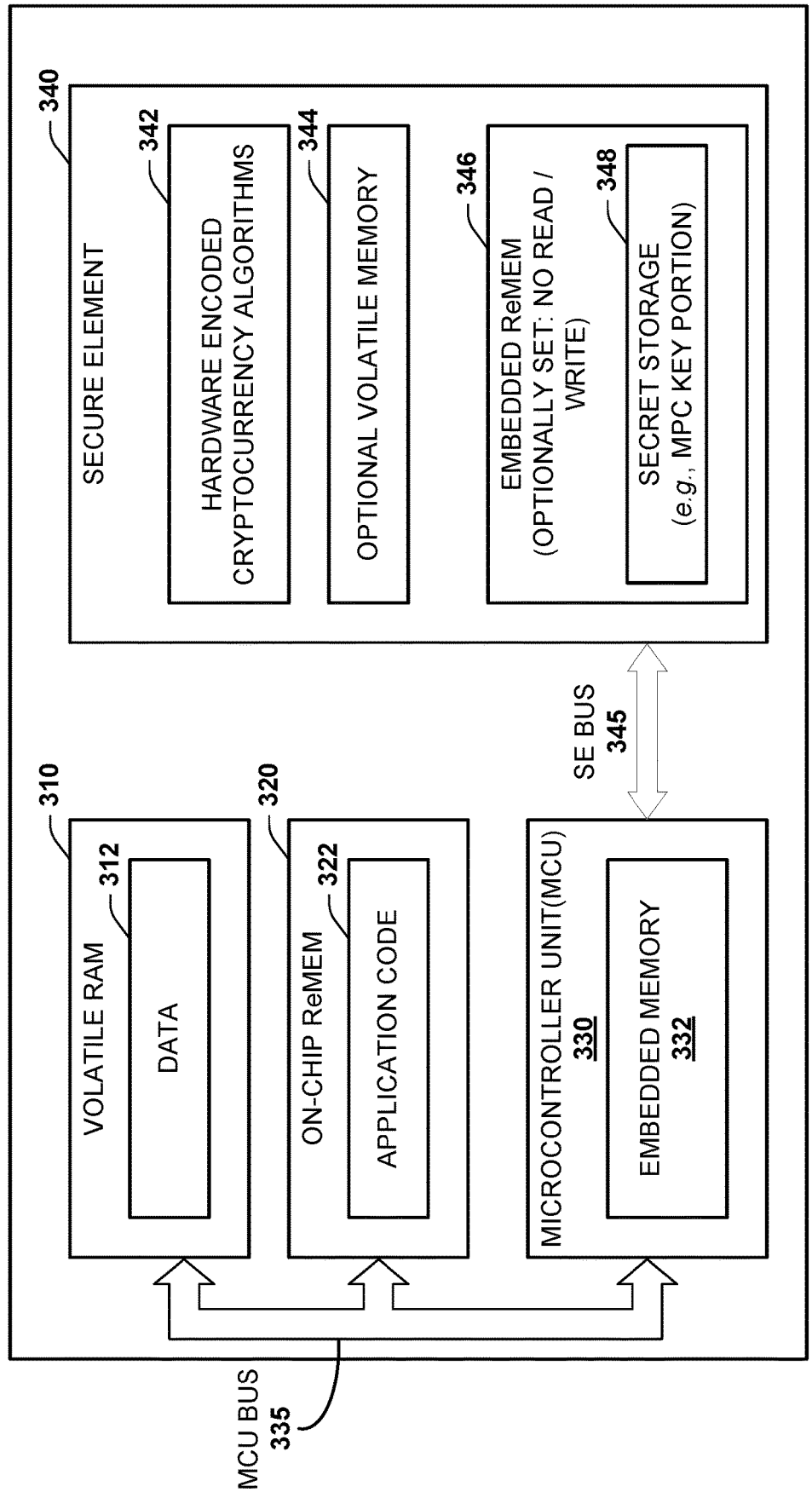
FIG. 3 depicts a block diagram of an example monolithic cryptocurrency wallet device according to alternative or additional embodiments of the present disclosure.

FIG. 3 depicts a block diagram of an example integrated circuit device implemented as a monolithic crypto wallet device 300, according to various aspects of the disclosed embodiments. Crypto wallet device 300 can comprise a microcontroller unit (MCU) 330, an on-chip resistive memory (ReMEM) 320 and a volatile memory 310, as shown. MCU 330 can include an embedded memory 332 (volatile or non-volatile) in one or more embodiments, which can include at least a portion of on-chip ReMEM 320 or can be separate from and in addition to on-chip ReMEM 320, in further embodiments. On-chip ReMEM 320 can store application code for execution at MCU 330. Volatile memory 310 can be utilized for operating data associated with executing application code at MCU 330, at least a portion of which can also be stored at embedded memory 332, where suitable.

In conjunction with executing a cryptographic application(s), MCU 330 can communicate with a secure element 340. As disclosed herein, MCU 330, on-chip ReMEM 320 and volatile memory 310 can be embedded together with secure element 340 (and its sub-components) in a single monolithic chip on a single substrate, in various embodiments. This monolithic integration can enhance security of communications between MCU 330 and secure element 340. Moreover, secure element 340 can include hardware encoded cryptocurrency algorithms 342. These algorithms can include sets of cryptographic primitives (e.g., see atomic operations 444 of FIG. 4, infra) as one example, that can be executed in sequence to perform a cryptocurrency algorithm, such as primitives defining a user authentication, a cryptocurrency hash algorithm followed by a validation of a cryptocurrency transaction, or the like, or suitable combinations of the foregoing. Hardware encoded cryptocurrency algorithms 342 can be executed in response to a command(s) received at secure element 340 from MCU 330. Where embodying cryptographic primitives, hardware encoded cryptocurrency algorithms 342 can receive commands (or command arguments) specifying a sequence order of executing a plurality of primitives that implement an algorithm more complex than individual primitives. Moreover, different subsets of primitives or different sequences, or combinations thereof, can each implement different algorithms, as would be known in the art or reasonably conveyed to one of ordinary skill in the art by way of the context provided herein.

Secure element 340 can include an embedded ReMEM 346. Embedded ReMEM 346 can include a secret storage 348 that includes secret data. In at least one embodiment, embedded ReMEM 346 can optionally be set to no read/no write to prevent access to secret storage 348. In such embodiment(s), embedded ReMEM 346 can have limited processing logic to process a simple query associated with the secret data stored in secret storage 348, without exposing the secret data external to embedded ReMEM 346. The simple query can confirm a hash algorithm, confirm an encryption/decryption result, or the like, initiated with the secret data. In other embodiments, embedded ReMEM 346 can permit access to secret storage 348 on a limited basis. For example, hardware encoded cryptocurrency algorithms 342 can be permitted to access secret storage 348, but nothing external to secure element 340, in an embodiment(s). Secure element 340 (or embedded ReMEM 346) can be configured to differentiate commands, data requests, and the like, originating at hardware logic 344 from requests originating external to secure element 340, in such embodiment(s).

In one or more embodiments, secure element 340 can include optional volatile memory 344. Optional volatile memory 344 can be utilized as working memory to store values of hardware encoded cryptocurrency algorithms 342. As one example, where a hardware encoded cryptocurrency algorithm 342 involves execution of multiple cryptocurrency primitives, a data value(s) resulting from execution of a first crypto primitive can be held at optional volatile memory 344 and accessed by a subsequent crypto primitive to produce a second data value(s), and so on (e.g., see data signals 460 and further data signals 462 of FIG. 4, infra).

Although not shown, monolithic crypto wallet device 300 can include a communication interface (not depicted, but see, e.g., communication interface 240) in at least some embodiments disclosed herein. The communication interface can be configured to provide limited communication with an external device, or network. This limited communication can facilitate updating of application code 322 and storage of new applications at application code 322. In addition, the limited communication can facilitate validation of a device against data stored at secret storage 348, authentication of user credentials, executing a cryptographic algorithm, participating in a blockchain validation algorithm, or participating in a multi-party computation (MPC) process associated with any of the foregoing or associated with a like operation. To illustrate (though not be construed as limiting) a MPC process can include a MPC crypto validation process involving multiple devices comprising valid secret data, or a portion of the valid secret data to authorize, initiate or otherwise participate in a cryptocurrency or blockchain transaction. The multiple devices can include for instance: crypto wallet device(s) 300 and an associated electronic user device(s) (communicatively coupled to crypto wallet device(s) 300 by the communication interface), a cloud validation server(s), or other suitable device(s), or a suitable combination of the foregoing (e.g., see FIG. 7, infra).

Monolithic crypto wallet device 300 can provide different communication bus structures for communications among components thereof. An MCU bus 335 can provide communications between MCU 330 and volatile memory 310 and on-chip ReMEM 320. MCU bus 335 can be an unrestricted bus, facilitating all suitable electronic communication between a processor and memory (ies) as known in the art. In addition, an SE bus 345 can facilitate communication between MCU 330 and SE 340. In at least some embodiments, SE bus 345 can be a limited communication bus. For instance, where MCU 330 is a multi-core processor, SE bus 345 can permit communication between MCU 330 and SE 340 originating at a first core of the multi-core processor (e.g., an authorized core; a core having a valid authorization code, etc.) and can deny communication between MCU 330 and SE 340 originating at a second core of the multi-core processor (e.g., an unauthorized core; a core not having the valid authorization code, etc.). As another example, SE bus 345 can permit communication between MCU 330 and SE 340 for an application being executed by MCU 330 that is authorized to communicate with SE 340, or for a process or logic thread being executed at MCU 330 that is authorized to communicate with SE 340, or the like, or a suitable combination of the foregoing (e.g., see U.S. patent application Ser. No. 18/218,948, incorporated by reference hereinabove, at FIGS. 3-5 and associated written descriptions, among others thereof).

Figure 4:
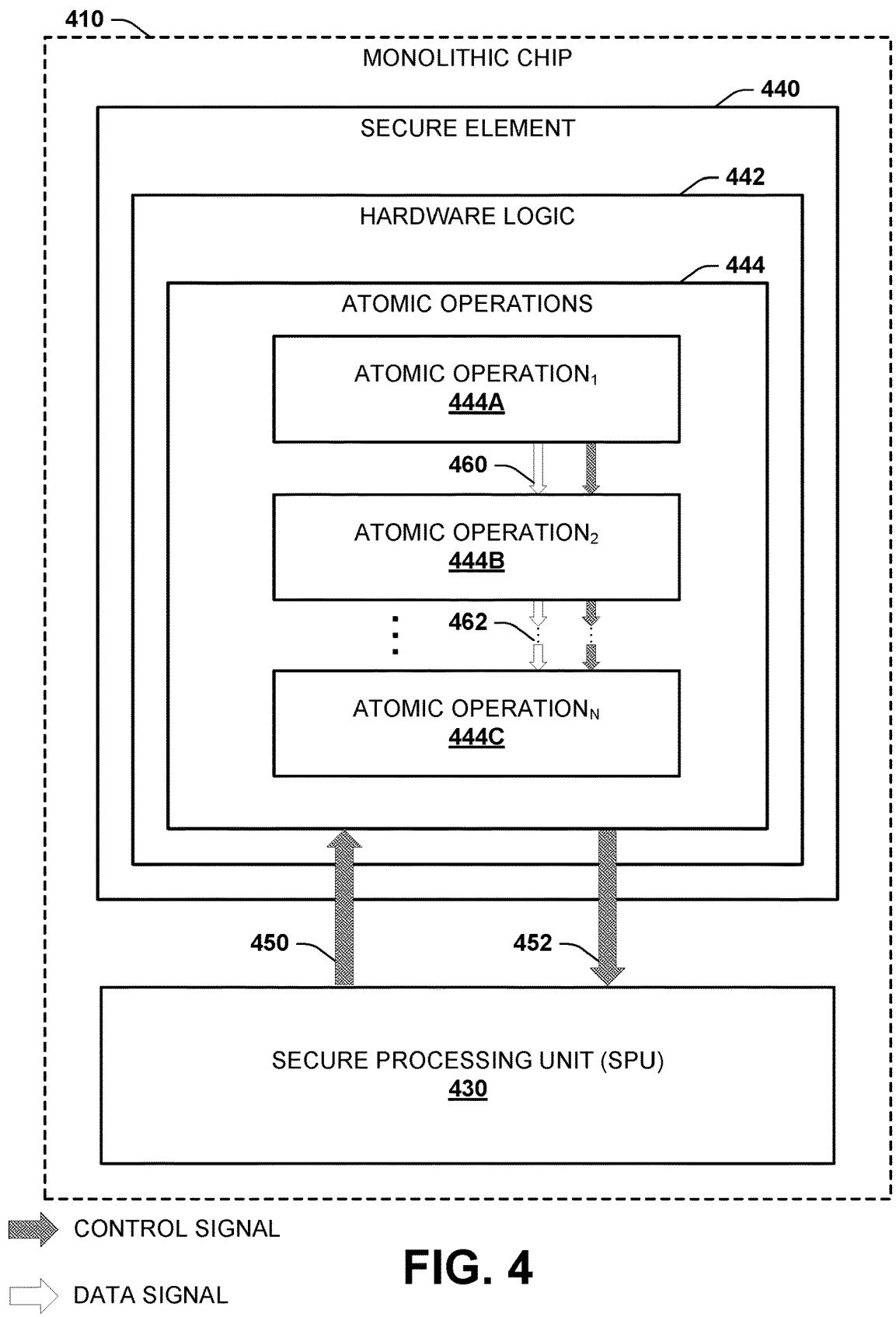
FIG. 4 illustrates a secure processing unit and secure element operating in a state-machine mode according to one or more disclosed embodiments.

FIG. 4 illustrates a secure processing environment 400 including a secure processing unit (SPU) 430 and a secure element 440 operable as a state machine, in one or more embodiments of the present disclosure. Moreover, SPU 430 and secure element 440 can both be physically embodied on a single monolithic chip, on a single substrate (as opposed, e.g., to a SPU embodied on a first substrate that is bonded to a second substrate in which a secure element is embodied). This can allow electrical signal communications between SPU 430 and secure element 440 to be physically located entirely within an interior volume of monolithic chip 410 without conductive exposure outside of monolithic chip 410. In various embodiments, these electrical signal communications can be conveyed by conductive lines within etched pathways (or masked pathways, or otherwise constructed) connecting SPU 430 within one portion of monolithic chip 410 to secure element 440 within another portion of monolithic chip 410. In further embodiments, the electrical signal communications can be conveyed by conductive lines such as vertical interconnects disposed within vias between a first layer of a monolithic chip 410 on which SPU 430 resides and a second layer on which secure element 440 resides, where at least a portion of the second layer overlies (or underlies) the first layer of the monolithic chip 410. In yet other embodiments, a suitable combination of the foregoing conductive lines can be implemented (e.g., lines horizontally within a layer, vertically between layers, and suitable connections therebetween). Further, portions of monolithic chip 410 that are important to carrying out these communications (e.g., logic associated with SPU 430, with hardware logic 442, or an embedded ReMEM 346 and secret storage 348, or the like) can be placed between the conductive lines and exterior surfaces of monolithic chip 410 in some disclosed embodiments. In such embodiments, attempts to illicitly drill, remove, excavate or otherwise access the conductive lines within the interior volume of monolithic chip 410 from an exterior thereof risk destroying portions of monolithic chip 410 required to implement the electrical signal communication. This can disincentivize such illicit access, further improving upon secure communications between SPU 430 and secure element 440.

Secure processing environment 400 can embody one example implementation utilizing cryptographic primitives (e.g., atomic operations 444) for hardware encoded cryptocurrency algorithms 342. As shown, SPU 430 can issue a control signal 450 to atomic operations 444 to execute an algorithm embodied by a plurality of atomic operations 444. In the depicted example implementation (not intended to limit the scope of the disclosure), atomic operations 444 include a first atomic operation: atomic operation$_1$ 444A, a second atomic operation: atomic operation$_2$ 444B, through an N$^{th}$ atomic operation: atomic operation$_N$ 444C where N is an integer greater than one (referred to herein collectively as: atomic operations 444A-444C). The plurality of atomic operations 444 that execute the algorithm can include any two or more atomic operations 444A-444C in a sequence. A data signal 460 resulting from execution of a first atomic operation in the sequence (e.g., atomic operation$_1$ 444A in the example shown in FIG. 4) can be output to a second atomic operation in the sequence (e.g., atomic operation$_2$ 444B in FIG. 4), which can operate upon data signal 460. Further data signals 462 produced by atomic operation$_2$ 444B and any additional atomic operations in the sequence can result in a data signal received at a final atomic operation in the sequence (e.g., atomic operation$_N$ 444C in the example shown). Execution of the final atomic operation results in a reply control signal 452 provided to SPU 430 in response to control signal 450. In various aspects of the disclosed embodiments, data signals 460 and further data signals 462 can be stored in volatile memory of secure element 442 (not depicted, but see FIG. 3, supra).

Different pluralities of atomic operations 444A-444C can implement different algorithms, and different sequences of implementing a given plurality of atomic sequences 444A-444C, in at least some embodiments, can implement different algorithms again, and suitable combinations of the foregoing can implement still other algorithms in alternative or additional embodiments. Not all atomic operations 444 are necessarily required to implement at least some algorithms. To illustrate: atomic operation$_1$ 444A followed by atomic operation$_N$ 444C in a first sequence can implement a first algorithm; atomic operation$_N$ 444C followed by atomic operation$_1$ 444A (a second sequence) can implement a second algorithm; atomic operation$_2$ 444B followed by atomic operation$_1$ 444A and then atomic operation$_N$ 444C in a third sequence can implement a third algorithm, and so on.

In the embodiment(s) shown by secure processing environment 400, SPU 430 interacts with secure element 440 with control signals 450 and 452. Data signals 460 and 462 between atomic operations 444 implementing a command identified in control signal 450 are not available to SPU 430. Moreover, SPU 430 can have or cannot have direct communication with atomic operations 444, in different aspects of the disclosed embodiments.

Figure 5:
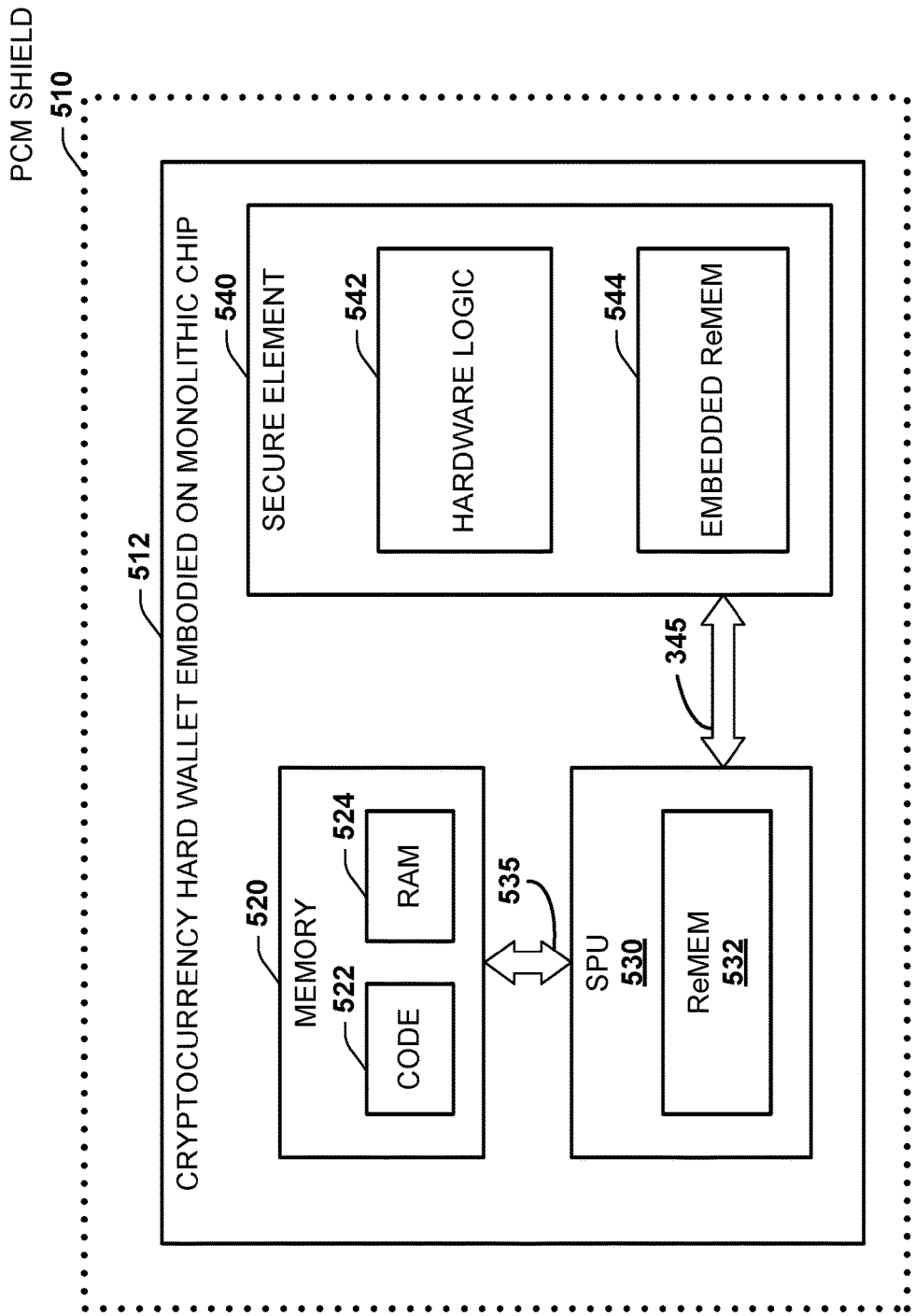
FIG. 5 depicts a block diagram of an example monolithic cryptocurrency hardware wallet with shared physical countermeasures (PCM) in an embodiment(s)

FIG. 5 depicts a block diagram of an example cryptocurrency wallet with shared physical countermeasures 500 in still additional aspects of the disclosed embodiments. A cryptocurrency wallet 512 can be embodied on a single monolithic chip as described herein. Cryptocurrency wallet 512 can include a SPU 530 coupled with a memory 520 including non-volatile application code 522 (e.g., non-volatile two-terminal or three-terminal memory, in different embodiments) and volatile memory 524 (e.g., volatile resistive switching memory, static random access memory, dynamic random access memory, etc.). SPU 530 and memory 520 can be communicatively connected by a SPU bus 535 in various embodiments, also formed within the single monolithic chip of cryptocurrency wallet 512. Additionally, cryptocurrency wallet 512 can comprise a secure element 540 embedded on the single monolithic chip. Secure element 540 can further comprise hardware logic 542 embodying one or more cryptography-related algorithms (e.g., see hardware accelerator(s) 230 of FIG. 2, supra). Secure element 540 can also comprise an embedded non-volatile memory 544 such as a ReMEM for storing secret data. Embedded non-volatile memory 544 can include PUF memory in one or more embodiments, for generating high non-correlated data for secure data applications of hardware logic 542. In further embodiments, cryptographic wallet 512 can also comprise a SE bus 345 formed within the single monolithic chip facilitating communication between SPU 530 and secure element 540, and in at least some embodiments limited communication between SPU 530 and secure element 540 (e.g., see SE bus 345 of FIG. 3, supra).

Still further, cryptocurrency wallet 512 and all components formed in the single monolithic chip can be protected by a common physical countermeasure (PCM) shield 510. PCM shield 510 can include a plurality of different PCM technologies. Examples include countermeasures against physical attacks, such as hacking probes, and the like. Physical countermeasure technologies can include an active shield, a security layout including redundant conductive lines, dummy conductive lines, and the like, as well as a security design incorporating a self-check algorithm (e.g., as part of application code stored at non-volatile application code 522 and run by SPU 530, or as part of hardware logic 542, or both), a dynamic logic algorithm (also stored at application code 522 or embodied by hardware logic 542), or the like, or suitable combinations of the foregoing. Examples of PCM technologies can further include countermeasures against fault injections such as a clock glitch(es), a laser fault injection(s), a voltage glitch(es), an electromagnetic (EM) fault injection(s), a thermal fault injection(s), and so forth. Examples of fault injection countermeasures can include a glue logic design (e.g., error coding, a register mirror, a write-verify routine, etc.), glue cells (also referred to as trigger cells) throughout the memory 520 or embedded non-volatile memory 544, an isolated clock, and fault injection detectors such as (strategically-positioned) voltage detectors, (strategically-positioned) electromagnetic radiation detectors (e.g., visible light detectors, infrared light detectors, ultraviolet light detectors, x-ray detectors, etc.), and the like. Further examples of PCM technologies can include countermeasures against side channel attacks, such as a simple power analysis (SPA) attack, a differential power analysis (DPA) attack, and an EM attack. Such side channel countermeasures can include algorithms and chip layout implementations that mitigate power analysis and EM attacks, as well as walk-around countermeasures such as use of false operations by SPU 530 or hardware logic 542, incorporation of clock jitter, embedding of power balancing circuitry (not depicted) within the single monolithic chip of cryptocurrency wallet 512, and so forth. Still other (miscellaneous) countermeasures can include strong/redundant lifecycle protection algorithms, multi-stage secure boot for cryptocurrency wallet 512, multi-signature access algorithms for cryptocurrency wallet 512, memory protection for memory 520 or embedded memory 544 (e.g., memory access control limitations within SE bus 345, encryption of data within memory 520 or embedded memory 544, and so forth), strong true random number generation (TRNG) coding (e.g., multiple TRNG encoding, self-checking TRNG algorithms), and the like. Various suitable combinations of these PCM technologies can be implemented with PCM shield 510 and can directly or indirectly protect all components of cryptocurrency wallet 512. Various aspects of the disclosed embodiments are expected to provide a significant enhancement in secure electronic data transactions.

Figure 6:
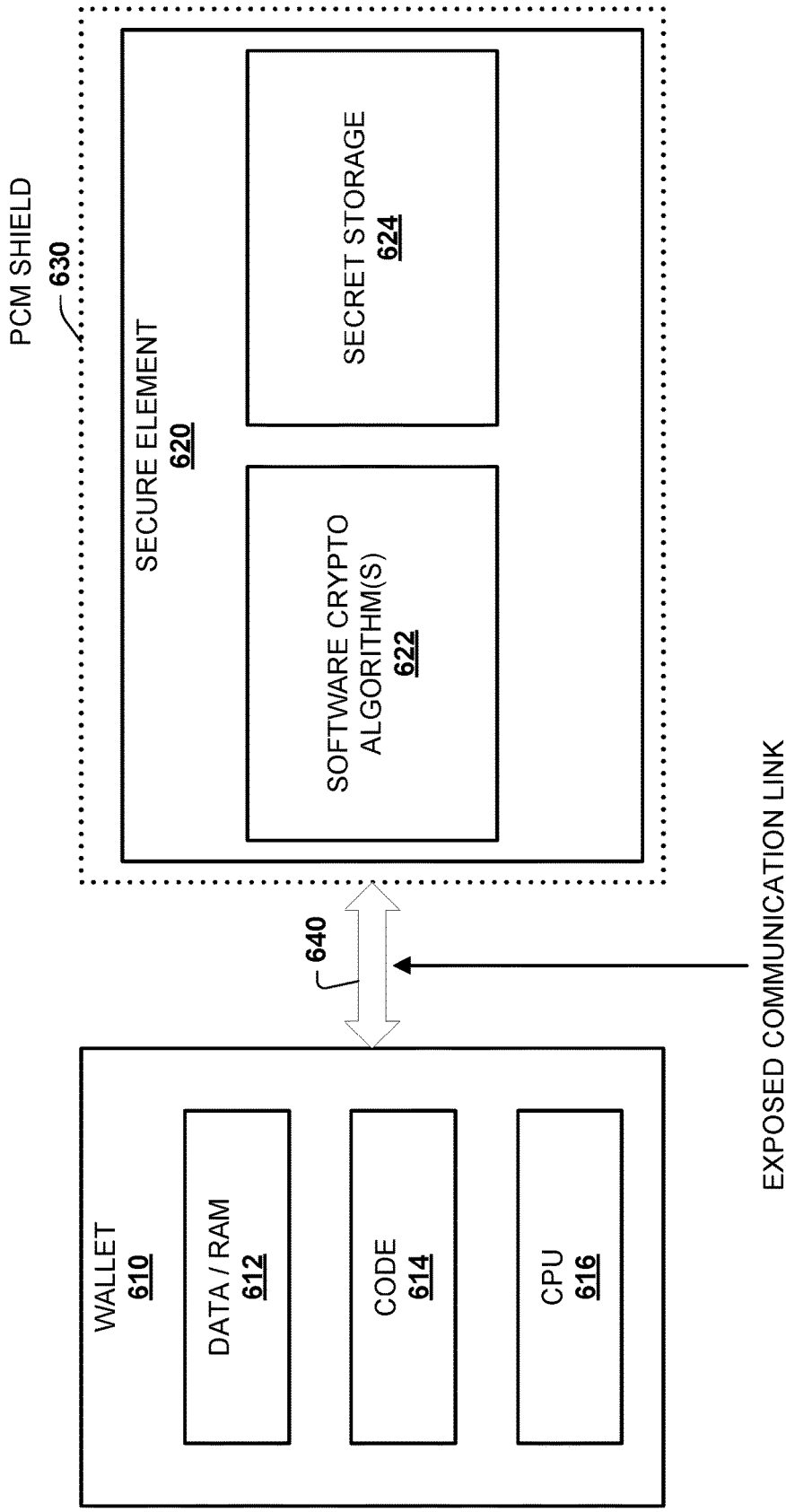
FIG. 6 illustrates a block diagram of a separate wallet hardware and secure element with separate PCM shield, in an alternative embodiment.

FIG. 6 illustrates a block diagram of an example non-monolithic crypto wallet and secure element 600 according to additional aspects. Crypto wallet 610 can be an electronic device comprising a data/ram memory 612, a code memory 616 and a central processing unit (CPU) 616. Code memory 616 can store software for executing one or more cryptographic applications according to various embodiments, such as a cryptocurrency exchange algorithm, a blockchain algorithm, or the like. A communication link 640 can communicatively connect crypto wallet 610 with a secure element 620, as shown. Secure element 620 can be an integrated circuit having a software cryptographic algorithm(s) 622 and secret storage 624 for validating or authenticating a user or a device (e.g., crypto wallet 610), or both, and for calculating and verifying results of a cryptographic process.

Secure element 620 can be protected by a PCM shield 630, as shown. PCM shield 630 can include physical, software and hardware measures to protect secure element 630 and a chip on which secure element 630 is formed from invasive attack, or illicit access. PCM shield 630 can include countermeasures against physical attacks, fault injections, side-channel attacks, and others. In general, PCM shield 630 is applicable to and protects secure element 620 but does not directly protect crypto wallet 610 or communication link 640, as shown. Accordingly, access to communication link 640 is easier for crypto wallet 610 and secure element 620 as compared with secure cryptocurrency wallet 512 where SPU 530, secure element 540 and communications between SPU 530 and secure element 540 are commonly protected by PCM shield 510 and furthermore are not physically accessible outside of a single monolithic chip, and far more difficult to compromise. Likewise, a PCM shield applicable to monolithic crypto wallet device 300, integrated circuit device 200, or monolithic chip 410 can add significant advantages to security, performance and flexibility of the disclosed secure integrated circuit devices.

Figure 7:
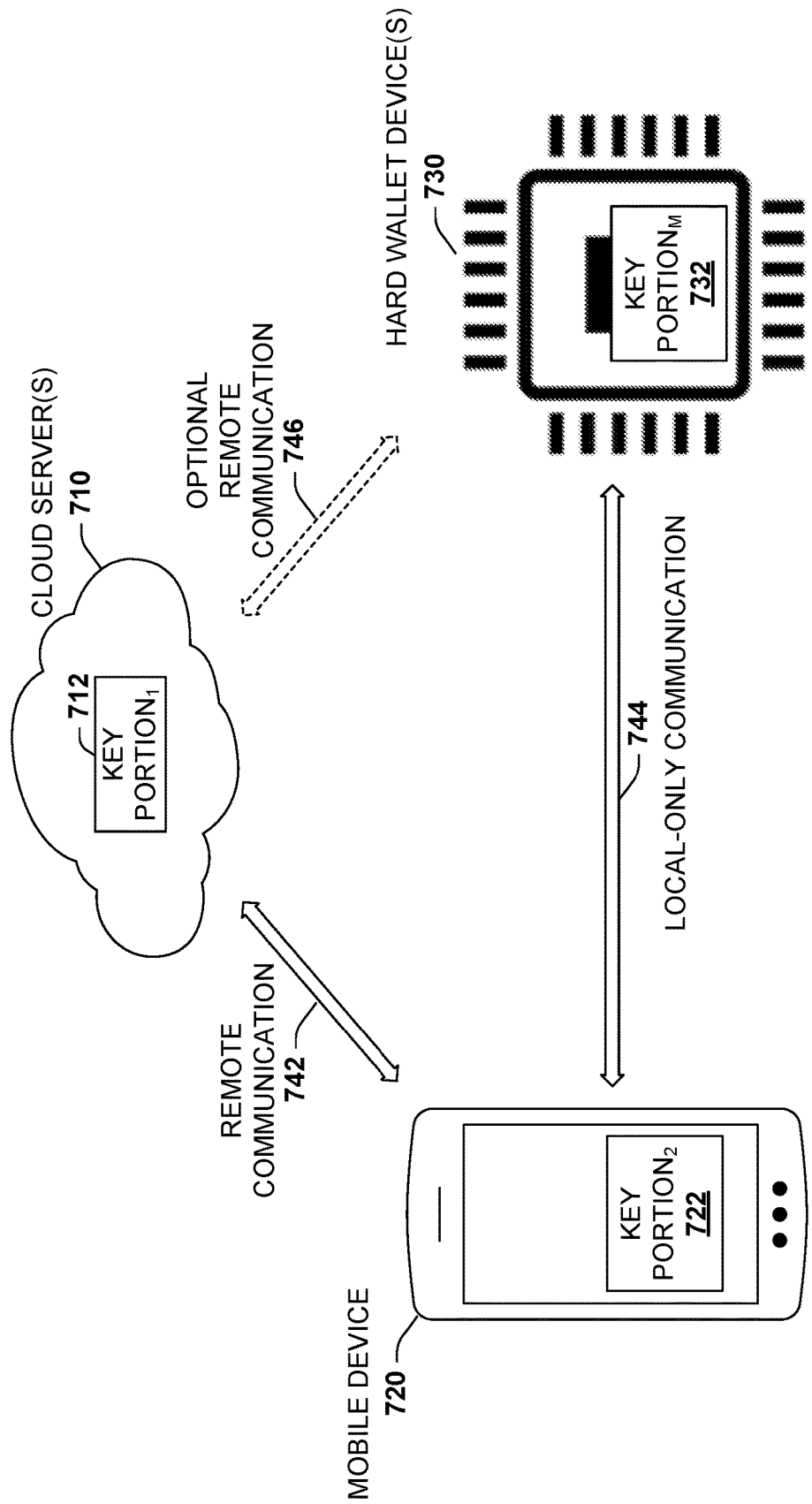
FIG. 7 depicts a diagram of an example multi-party communication (MPC) facilitating a secure transaction utilizing a disclosed limited hard wallet, in other embodiments.

FIG. 7 illustrates a network diagram of an example multi-party computation (MPC) environment 700 according to alternative or additional embodiments of the present disclosure. MPC environment 700 can facilitate a secure digital transaction according to various embodiments of the present disclosure. In some instances, a transaction on a blockchain, such as a Bitcoin blockchain, can be based on a single private key. The private key can be maintained by a user on a user electronic device (e.g., a self-custodial digital wallet device) or can be maintained by a service provider such as a digital currency exchange (e.g., a non-custodial digital wallet device or service). Each variety has benefits and detriments. The self-custodial digital wallet gives the user full and exclusive control over their private key and digital cryptocurrency assets. However, losing the wallet device, password or passphrase could result in loss of the cryptocurrency assets. The non-custodial wallet preserves the private key for the user, providing convenience. But it also requires trust, as the service has full control over the cryptocurrency assets. MPC environment 700 provides a hard wallet device(s) 730 and an N of M multi-party computation framework that enables a user to self-validate a cryptocurrency transaction or to coordinate with a server device to validate the cryptocurrency transaction. Accordingly, MPC environment 700 avoids loss of a single electronic device as being fatal to recovery of cryptocurrency assets, can provide flexibility and convenience available with cloud-based digital transaction services without surrendering control over the cryptocurrency assets to the service provider. In some embodiments, MPC environment 700 can even avoid loss of multiple electronic devices as being fatal to recovery of the cryptocurrency assets, by implementing proper recovery methods with MPC environment 700.

In general, for blockchain applications, validation of a transaction affecting an asset registered on a blockchain is typically done by the blockchain itself. A cryptocurrency algorithm utilized by MPC environment 700 (e.g., an N of M multi-party computation algorithm) can be implemented as a signing algorithm to produce or confirm a valid transaction signature associated with the transaction. As a more specific example, the cryptocurrency algorithm can utilize a MPC algorithm for decentralized execution of a signing algorithm. In this example, each device containing a secret data portion (e.g., private key share, etc.) can verify respective other devices and collectively produce a valid transaction signature for the transaction. Moreover, the valid transaction signature can be produced while maintaining secrecy of each secret data portion.

MPC environment 700 can utilize an N of M multi-party computation algorithm for validating a cryptocurrency algorithm. M is a first integer defining a total number of secret data portions (e.g., private keys, private key portions, private key shares or the like) defined for the cryptocurrency algorithm, and N is a second integer defining a second number of the M secret data portions that are required to validate (or execute) the cryptocurrency algorithm. As an example, in a 3 of 3 MPC algorithm, a total number of secret data portions is 3, and a second number of the secret data portions required to validate the cryptocurrency algorithm is also 3. Thus, for a 3 of 3 MPC algorithm, all of the secret data portions must be provided to validate (execute) the cryptocurrency algorithm. As another example, in a 2 of 3 MPC algorithm, the total number of secret data portions defined for the 2 of 3 algorithm is 3, and the second number of secret data portions required to validate the cryptocurrency algorithm is (any) 2 of the 3 total secret data portions.

MPC environment 700 can include a first secret data portion: key portion$_1$ 712 stored at a cloud server(s) device 710. Cloud server(s) device 710 can be maintained by a cryptocurrency transaction service provider, as one example. A second secret data portion: key portion$_2$ 722 can be stored at an electronic device (e.g., a computer, a mobile device, a smartphone, or the like) of a user, and one or more additional secret data portions: key portion 732 can be stored at respective hard wallet devices 730, where M is an integer greater than 2. With a single hard wallet device 730, MPC environment 700 can model a suitable N of 3 MPC algorithm, such as a 2 of 3 MPC algorithm, a 3 of 3 MPC algorithm (or even a 1 of 3 MPC algorithm). With multiple hard wallet devices 730 having respective secret key portions 732, MPC environment 700 can implement a N of 4 MPC algorithm, a N of 5 MPC algorithm, and so forth.

Where the N of M cryptocurrency algorithm defines N as M−1 (or less), a user can retain personal control over its digital currency assets, yet utilize cloud server(s) 710 as a backup of one secret key portion in the event mobile device 720 (and key portion$_2$ 722) becomes lost, or in the event that (one of) hard wallet device 730 (and key portion$_M$ 732) becomes lost, or the like. As long as the user retains either key portion$_2$ 722 or key portion$_M$ 732, in the 2 of 3 MPC algorithm embodiment, the user can connect with cloud server(s) 710 to access key portion$_1$ 712 and validate the N of M cryptocurrency algorithm. Only if both key portion$_2$ 722 and key portion 732 are lost would the user risk loss of cryptocurrency assets associated with the N of M cryptocurrency algorithm. In at least one embodiment, a user can retain a backup hard wallet device 730 having a copy of key portion 732 allowing recovery of cryptocurrency assets even if mobile device 720 is lost and one hard wallet device 730 is lost. In another embodiment, the backup hard wallet device 730 can have a key portion$_{M+1}$ to replace the key portion 732, and as long as the N of M cryptocurrency algorithm defines N as no larger than 2, a user can validate the N of M cryptocurrency algorithm and recover cryptocurrency assets with the backup hard wallet device 730 and key portion$_{M+1}$ and cloud server(s) 710 and key portion$_1$ 712. Alternatively, MPC environment 700 can define multiple backup hard wallet devices 730 with respective key portions 732. In such embodiment, as long as sufficient numbers of backup hard wallet devices 730 and respective key portions 732 are available for connecting with cloud server(s) 710, the cryptocurrency algorithm can be validated (e.g., with a 3 of 5 cryptocurrency algorithm, two backup hard wallet devices 730 and respective key portions can be coupled with cloud server 710 and key portion$_1$ 712 to validate the 3 of 5 cryptocurrency algorithm, and so forth.

In various embodiments, network communication capability of hard wallet device(s) 730 can be limited to protect security of key portion$_M$ 732. In an embodiment, hard wallet device(s) 730 can be limited to a local-only communication 744 with mobile device 720. Local-only communication 744 can be a smartcard port within mobile device 720 that can physically receive and communicatively couple to hard wallet device(s) 730, or a similar port that can physically receive and communicatively couple to hard wallet device(s) 730, such as a USB card port, a sim card port, and so forth. In other embodiments, local-only communication 744 can be a physical communication connection such as a wired USB connection, an IEEE 1394 connection, serial connection, parallel connection, or other suitable wired communication bus connection. In still other embodiments, local-only communication 744 can be a local-only wireless connection, such as a Bluetooth® connection, a personal wireless network, or similar. Where hard wallet device(s) 730 has no communication with cloud server(s) 710, mobile device 720 can serve as the common communication device between hard wallet device(s) 730 and cloud server(s) 710 for MPC environment 700.

In at least some embodiments, hard wallet device(s) 730 can be configured to establish an optional remote communication 746 with cloud server(s) 710, to enable communication between cloud server(s) 710 and hard wallet device(s) 730 without requiring mobile device 720 as a platform to establish remote communication 742 between mobile device 720 and cloud server(s) 710. In such embodiments, optional remote communication 746 can be a WiFi connection, a cellular internet connection, or other long-range public or private communication network. In other embodiments, optional remote communication 746 can be a dedicated connection, an encrypted connection, such as a virtual private network (VPN) connection, and so forth.

The diagrams included herein are described with respect to several electronic devices, microcontrollers, and an integrated circuit product(s) comprising multiple devices, microcontrollers, or memory structures. It should be appreciated that such diagrams can include those devices, microcontrollers, etc., specified therein, some of the specified devices/microcontrollers, or additional devices/microcontrollers not explicitly depicted but known in the art or reasonably conveyed to those of skill in the art by way of the context provided herein. Components of disclosed integrated circuit devices can also be implemented as sub-components of another disclosed component (e.g., data/ram 212 can be a sub-component of processor 216), whereas other components disclosed as sub-components can be separate components in various embodiments (e.g., embedded ReMEM 346 can be separate from secure element 340; embedded memory 332 can be external to microcontroller unit (MCU) 330, and so forth). Further, embodiments within a particular Figure of the present specification can be applied in part or in whole to other embodiments depicted in other Figures without limitation, subject only to suitability to achieving a disclosed function or purpose as understood by one of skill in the art, and vice versa. As illustrative (and non-limiting) examples, processor 216 of FIG. 2 or MCU 330 of FIG. 3 can be substituted for SPU 430 of FIG. 4; MCU 330 or SPU 430 can incorporate some or all memory array control components of FIG. 11 (e.g., row control 1104, sense amps 1108, column control 1106, clock source(s) 1110, address register 1114, reference and control signal(s) generator 1118, state machine 1120, input/output buffer 1112, command interface 1116), or suitable components of operating and control environment 1100 or environment 1200 can be substituted or added to other components or integrated circuit devices disclosed herein, and so forth. Additionally, it is noted that one or more disclosed processes can be combined into a single process providing aggregate functionality. For instance, a cryptographic algorithm process can include a secure user/device authentication process, or vice versa, to facilitate performing a cryptocurrency exchange algorithm and verifying proper user/device access to a stored cryptocurrency account, by way of a single process. Components of the disclosed architectures can also interact with one or more other components not specifically described herein but known by or reasonably conveyed to those of skill in the art.

Figure 8:
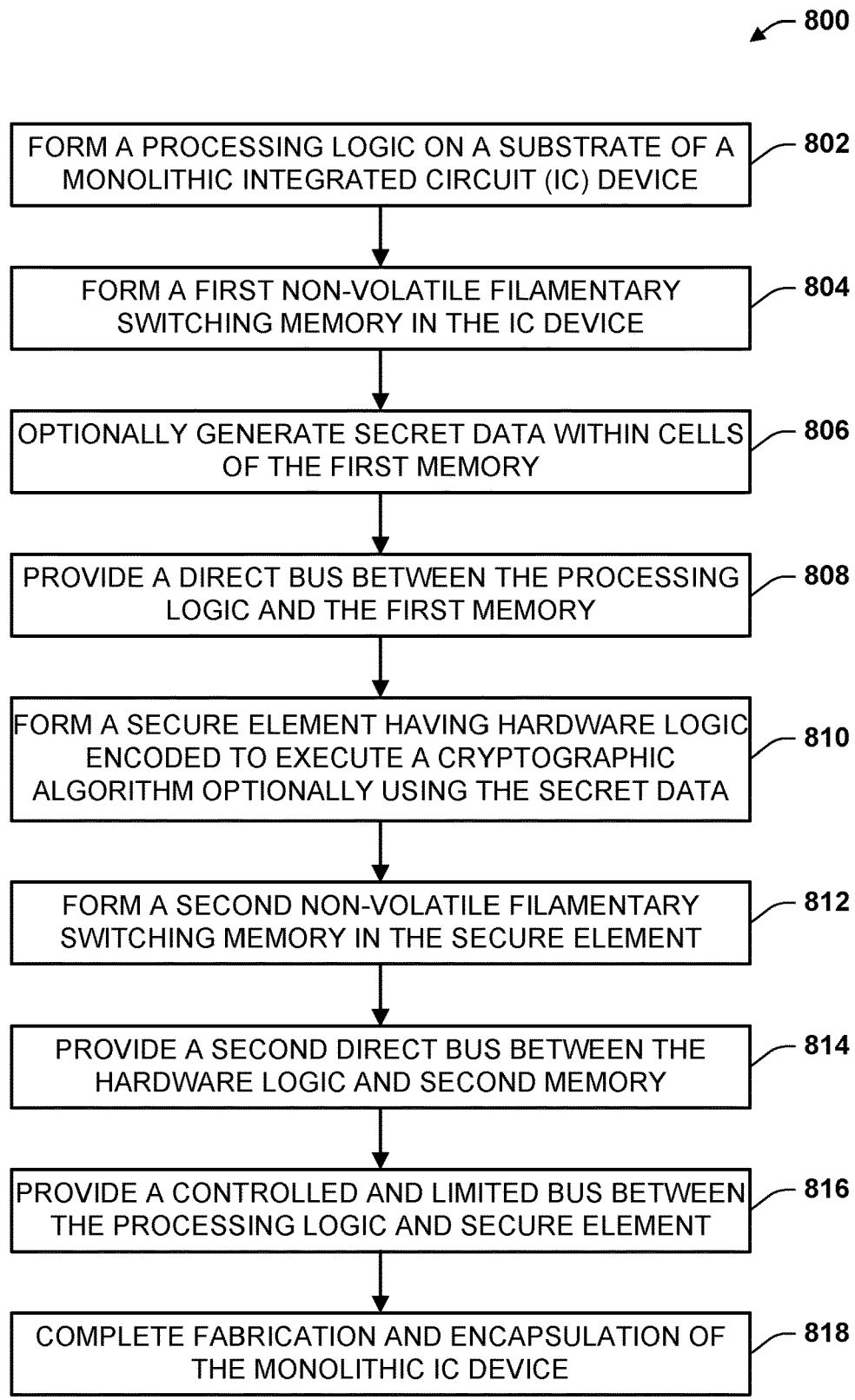
FIG. 8 depicts a sample flowchart of a method for fabricating a monolithic semiconductor die according to one or more additional embodiments of the disclosure.
Figure 9:
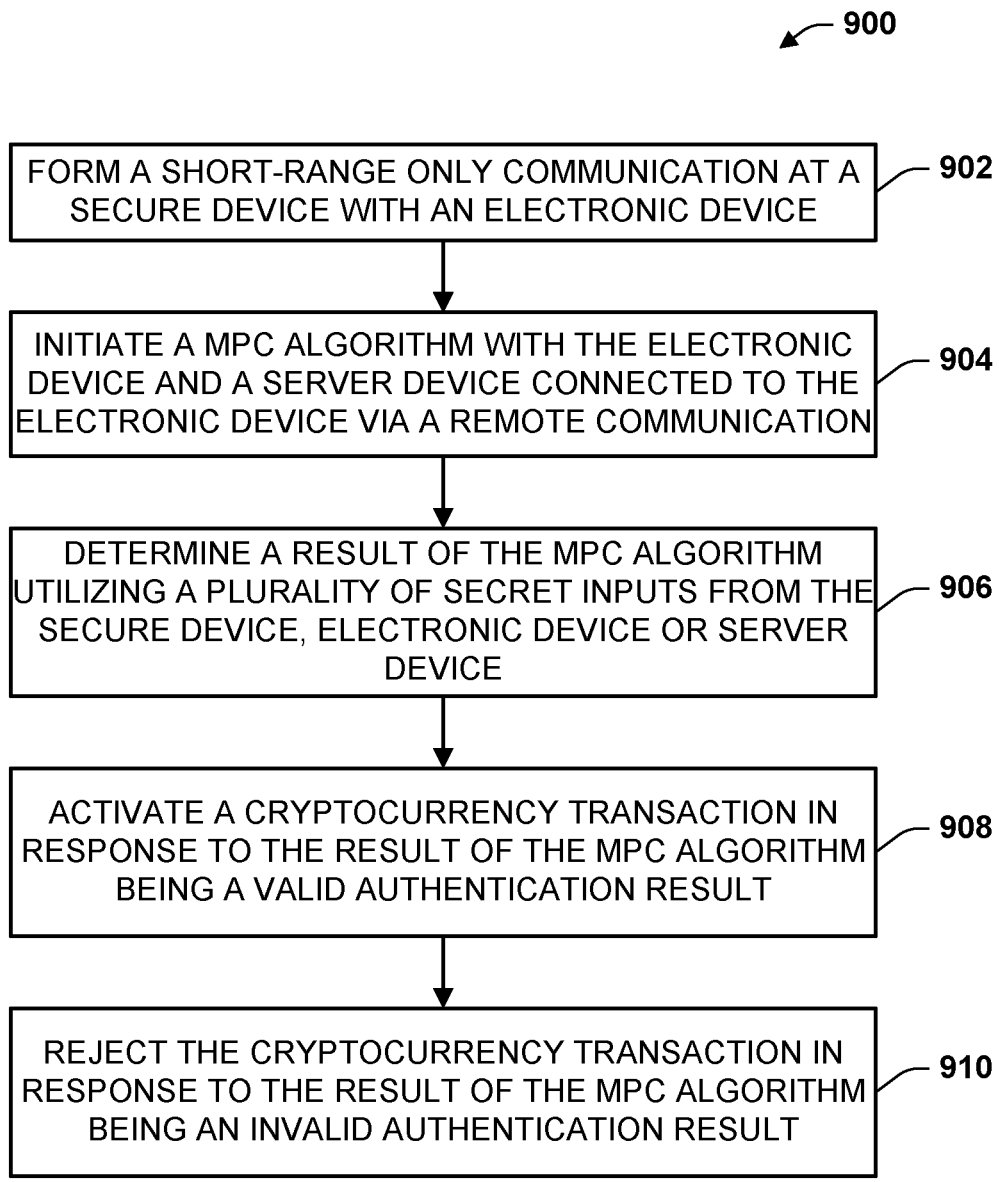
FIG. 9 illustrates a flowchart of an example method for implementing a secure transaction according to additional aspects of the disclosed embodiments.
Figure 10:
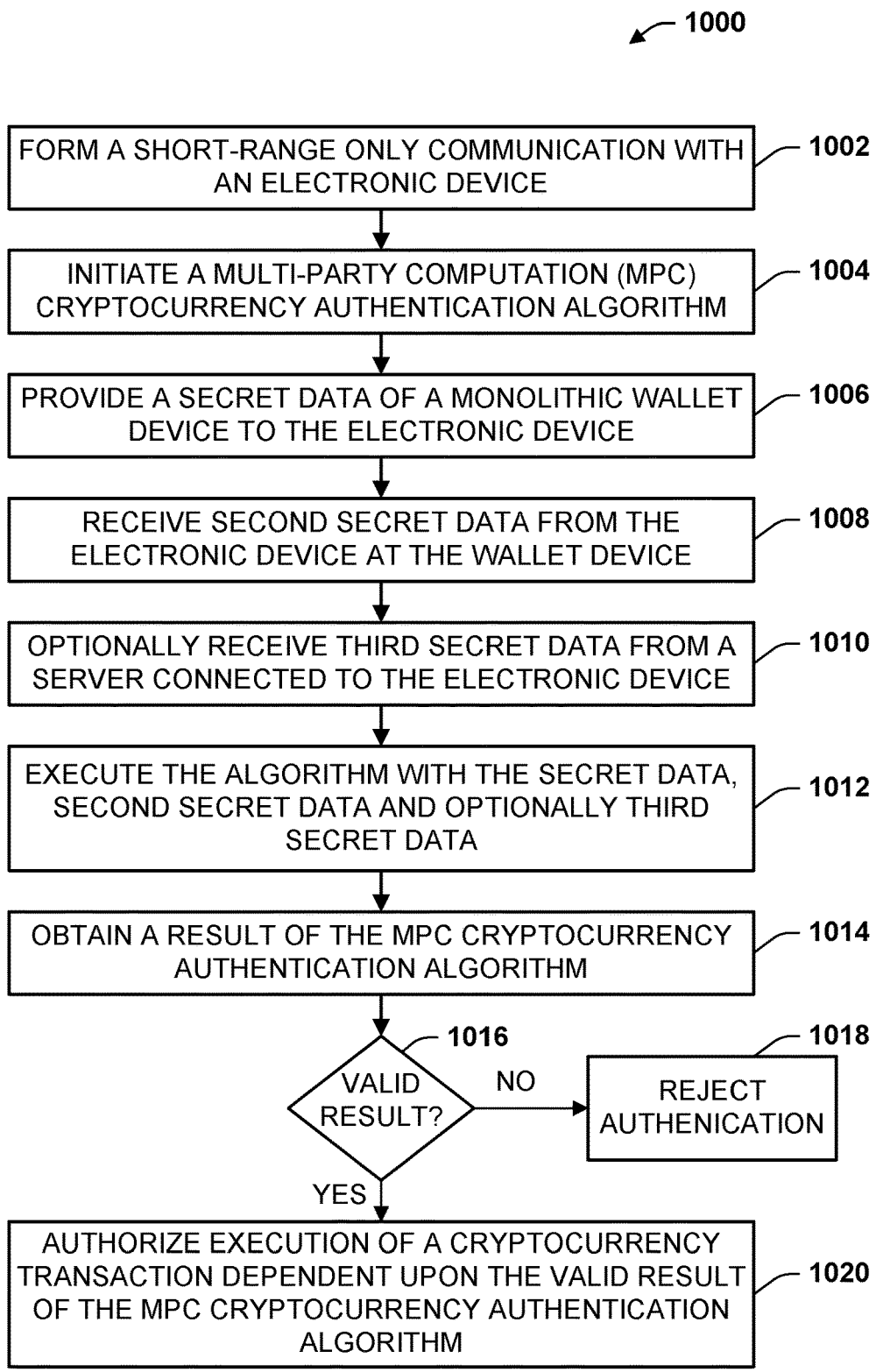
FIG. 10 depicts a flowchart of an example method for implementing a cryptocurrency transaction with a limited hardware wallet device, in still further embodiments.

In view of the exemplary diagrams described supra, process methods that can be implemented in accordance with the disclosed subject matter will be better appreciated with reference to the flow charts of FIGS. 8-10. While for purposes of simplicity of explanation, the methods of FIGS. 8-10 are shown and described as a series of blocks, it is to be understood and appreciated that the claimed subject matter is not limited by the order of the blocks, as some blocks may occur in different orders or concurrently with other blocks from what is depicted and described herein. Moreover, not all illustrated blocks may be required to implement the methods described herein, and in some embodiments additional steps known in the art or reasonably conveyed to one of ordinary skill in the art by way of the context provided herein can be implemented as part of a disclosed method within the scope of the present disclosure. Moreover, some steps illustrated as part of one process can be implemented for another process where suitable; other steps of one or more processes can be added or substituted in other processes disclosed herein within the scope of the present disclosure. Additionally, it should be further appreciated that the methods disclosed throughout this specification are capable of being stored on an article of manufacture to facilitate transporting and transferring such methods to an electronic device, stored in embedded memory within the electronic device, and so forth. The term article of manufacture, as used, is intended to encompass a computer program accessible from any computer-readable device, device in conjunction with a carrier, or storage medium, or the like.

FIG. 8 illustrates a flowchart of a sample method 800 for fabricating a monolithic integrated circuit (IC) device according to one or more additional embodiments of the present disclosure. Method 800 can comprise, at 802, forming, on a substrate of a monolithic IC die, a processing logic. Moreover, at 804, method 800 can comprising forming a first non-volatile filamentary switching memory in the IC device. At 806, method 800 can optionally comprise generating secret data within memory cells of the first non-volatile filamentary switching memory. At 808, method 800 can comprise providing a direct communication bus between the processing logic and the first non-volatile filamentary switching memory. Moreover, at 810, method 800 can comprise forming a secure element on the substrate. In some embodiments, forming the secure element can additionally comprise: form a hardware logic encoded to execute a cryptographic algorithm within the secure element. At 812, method 800 can comprise forming a second non-volatile filamentary switching memory for the secure element within the monolithic IC die and overlying the substrate, and at 814, method 800 can comprise forming a second direct bus between the hardware logic and the second non-volatile filamentary switching memory. Additionally, at 816, method 800 can comprise providing a controlled and limited bus between the processing logic and the secure element. At 818, method 800 can comprise completing fabrication and encapsulation of the monolithic IC device.

In one or more embodiments, the processing logic formed on the substrate of the monolithic IC device can embody a multi-core processing device defining a plurality of processor cores. In an embodiment, a first portion of the plurality of processor cores can be authorized and enabled to communication on the controlled and limited bus between the processing logic and the secure element, and a second portion of the plurality of processor cores can be unauthorized and prevented from communication on the controlled and limited bus. As an example, a core of the plurality of processor cores can be authenticated for communication on the controlled and limited bus and access to the secure element, and a second core of the plurality of processor cores can be not authenticated for the controlled and limited bus and restricted from access to the secure element.

In alternative or additional embodiments, the first non-volatile filamentary switching memory can be configured to store application software. In such embodiment(s), the processing logic can be configured for saving, updating and executing software application code stored at the first non-volatile filamentary switching memory. In yet another embodiment(s), the hardware logic encoding of the cryptographic algorithm can be a permanent encoding that is not modifiable through software. This permanent encoding can mitigate or avoid vulnerability to software viruses or other hacking or compromise attacks, in various disclosed embodiments.

FIG. 9 illustrates a flowchart of an example method 900 for authenticating a cryptocurrency transaction, according to still other embodiments of the present disclosure. At 902, method 900 can comprise forming a short-range only communication link between a secure device and an electronic device. The secure device can be embodied exclusively within a monolithic chip formed on a single substrate, in various embodiments. At 904, method 900 can comprise initiating a MPC algorithm with the electronic device and with a server device communicatively connected to the electronic device by way of a second communication link. In aspects of the disclosed embodiments, the second communication link can be a remote communication that is separate from (and optionally exclusive of) the short-range only communication link.

In further embodiments of the present disclosure, at 906, method 900 can comprise determining a result of the MPC algorithm utilizing a plurality of: a first secret input stored within a secure element of the secure device, a second secret input supplied by the electronic device over the short-range only communication, or a third secret input received from the server device at the electronic device over the second communication link and supplied by the electronic device over the short-range only communication. At 908, method 900 can comprise (conditionally) activating the cryptocurrency transaction in response to the result of the MPC algorithm being a valid authentication result, or at 910, method 900 can comprise (conditionally) rejecting the cryptocurrency transaction in response to the result of the MPC algorithm being an invalid authentication result.

In an embodiment, the MPC algorithm can be a N of M threshold algorithm, wherein M defines a total number of inputs to the MPC algorithm and N defines a second number of valid inputs required to produce the valid authentication result as the result of the MPC algorithm. In various aspects, the second number of valid inputs can be smaller than the total number of inputs, but in at least some embodiments the second number of valid inputs can equal the total number of inputs.

In another embodiment(s), determining the result of the MPC algorithm further comprises providing as inputs to the MPC algorithm, at the secure device, the plurality of: the first secret input, the second secret input or the third secret input. Additionally, the MPC algorithm can comprise executing the MPC algorithm, and determining whether the result of the MPC algorithm is the valid authentication result or the invalid authentication result.

In a further embodiment, the secure element of the secure device can comprise a resistive-switching or magnetic-switching memory array. In such embodiment, the first secret input can be stored at the resistive-switching or magnetic-switching memory array of the secure element.

In still other embodiments, the MPC algorithm can be at least in part a non-standard algorithm, an open-source algorithm or a user-customizable algorithm. The at least in part non-standard algorithm can include logic that is independent of (and therefore not qualified by or subject to) a national standards agency. The secure device can also include hardware logic that embodies the MPC algorithm. The MPC algorithm can be viewable by a user of the secure device (or electronic device coupled to the secure device) and in at least some embodiments, the MPC algorithm can be customizable (e.g., compile-able) by the user. For instance, the user can build an arbitrary algorithm from atomic functions (e.g., low-level cryptographic/mathematical primitives) embodied in hardware logic, or write code to a memory (e.g., memory 520) coupled with a SPU (e.g., SPU 530) within the secure device (e.g., 500). In various embodiments, determining the result of the MPC algorithm further comprises executing the MPC algorithm at the hardware logic. In an alternative or additional embodiment(s), the first secret input or the third secret input can be a digital copy of the second secret input supplied by the electronic device. In yet another embodiment, the first secret input and the second secret input and the third secret input can be copies of a single secret input. In yet another embodiment, the first secret input, second secret input and third secret input can all be different (and exclusive) data codes.

FIG. 10 depicts a flowchart of an example method 1000 for implementing a cryptocurrency transaction according to still further embodiments of the present disclosure. At 1002, method 1000 can comprise forming a short-range only communication with an electronic device, and at 1004 method 1000 can comprise initiating a multi-party computation (MPC) cryptocurrency algorithm (e.g., a threshold algorithm, or the like). At 1006, method 1000 can comprise providing a secret data of a monolithic wallet device to the electronic device, and at 1008 method 1000 can comprise receiving second secret data from the electronic device at the wallet device. Additionally, at 1010, method 1000 can optionally comprise receiving third secret data from a server connected to the electronic device by way of a remote communication link. At 1012 method 1000 can comprise executing the algorithm with the secret data, second secret data and optionally third secret data. At 1014, method 1000 can comprise obtaining a result of the MPC cryptocurrency threshold algorithm, and at 1016 a determination can be made as to whether the result is a valid result. If not, method 1000 can proceed to 1018 and can comprise rejecting authentication of the MPC cryptocurrency threshold algorithm. In response to the result being the valid result, method 1000 can proceed to 1020 and can comprise authorizing execution of the cryptocurrency transaction that is dependent upon the valid result of the MPC cryptocurrency threshold algorithm.

Example Operating Environments

Figure 11:
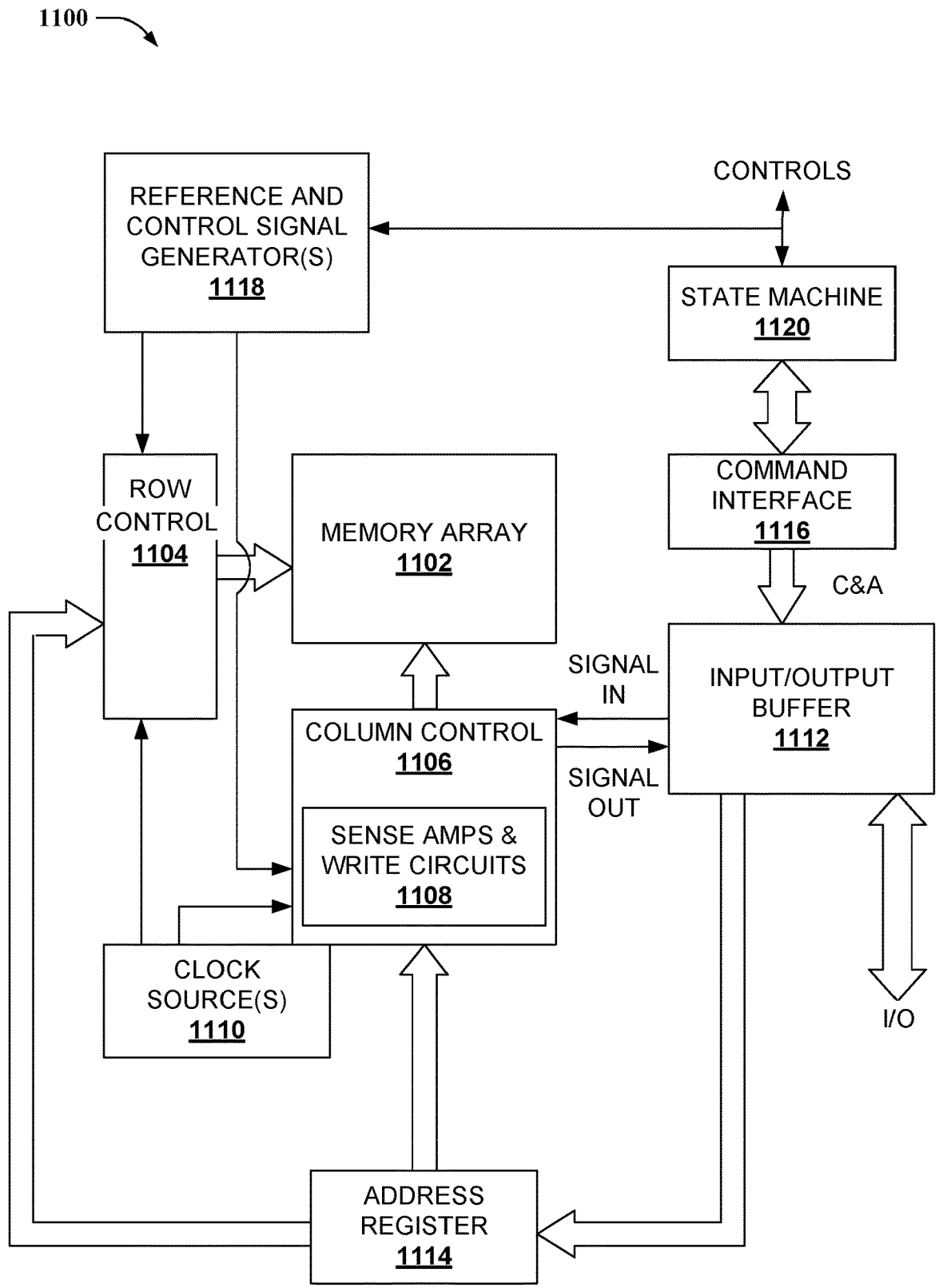
FIG. 11 illustrates a block diagram of an example electronic operating environment in accordance with one or more disclosed embodiments.

FIG. 11 illustrates a block diagram of an example operating and control environment 1100 for a memory array 1102 of a memory device according to aspects of the subject disclosure. Control environment 1100 and memory array 1102 can be formed within a single semiconductor die in some embodiments, although the subject disclosure is not so limited and in other embodiments some components of control environment 1100 can be formed on a separate semiconductor die. In at least one aspect of the subject disclosure, memory array 1102 can comprise memory selected from a variety of memory cell technologies. In at least one embodiment, memory array 1102 can comprise a two-terminal memory technology, arranged in a compact two or three-dimensional architecture. Suitable two-terminal memory technologies can include resistive-switching memory, conductive-bridging memory, phase-change memory, organic memory, magneto-resistive memory, or the like, or a suitable combination of the foregoing. In a further embodiment, the two-terminal memory technology can be a two-terminal resistive switching technology.

A column controller 1106 and sense amps 1108 can be formed adjacent to memory array 1102. Moreover, column controller 1106 can be configured to activate (or identify for activation) a subset of bit lines of memory array 1102. Column controller 1106 can utilize a control signal(s) provided by a reference and control signal generator(s) 1118 to activate, as well as operate upon, respective ones of the subset of bitlines, applying suitable program, erase or read voltages to those bitlines. Non-activated bitlines can be kept at an inhibit voltage (also applied by reference and control signal generator(s) 1118), to mitigate or avoid bit-disturb effects on these non-activated bitlines.

In addition, operating and control environment 1100 can comprise a row controller 1104. Row controller 1104 can be formed adjacent to and electrically connected with word lines of memory array 1102. Also utilizing control signals of reference and control signal generator(s) 1118, row controller 1104 can select one or more rows of memory cells with a suitable selection voltage. Moreover, row controller 1104 can facilitate program, erase or read operations by applying suitable voltages at selected word lines.

Sense amps 1108 can read data from, or write data to, the activated memory cells of memory array 1102, which are selected by column control 1106 and row control 1104. Data read out from memory array 1102 can be provided to an input/output buffer 1112. Likewise, data to be written to memory array 1102 can be received from the input/output buffer 1112 and written to the activated memory cells of memory array 1102.

A clock source(s) 1110 can provide respective clock pulses to facilitate timing for read, write, and program operations of row controller 1104 and column controller 1106. Clock source(s) 1110 can further facilitate selection of word lines or bit lines in response to external or internal commands received by operating and control environment 1100. Input/output buffer 1112 can comprise a command and address input, as well as a bidirectional data input and output. Instructions are provided over the command and address input, and the data to be written to memory array 1102 as well as data read from memory array 1102 is conveyed on the bidirectional data input and output, facilitating connection to an external host apparatus, such as a computer or other processing device (not depicted, but see e.g., computer 1202 of FIG. 12, infra).

Input/output buffer 1112 can be configured to receive write data, receive an erase instruction, receive a status or maintenance instruction, output readout data, output status information, and receive address data and command data, as well as address data for respective instructions. Address data can be transferred to row controller 1104 and column controller 1106 by an address register 1114. In addition, input data is transmitted to memory array 1102 via signal input lines between sense amps 1108 and input/output buffer 1112, and output data is received from memory array 1102 via signal output lines from sense amps 1108 to input/output buffer 1112. Input data can be received from the host apparatus, and output data can be delivered to the host apparatus via the I/O bus.

Commands received from the host apparatus can be provided to a command interface 1116. Command interface 1116 can be configured to receive external control signals from the host apparatus and determine whether data input to the input/output buffer 1112 is write data, a command, or an address. Input commands can be transferred to a state machine 1120.

State machine 1120 can be configured to manage programming and reprogramming of memory array 1102 (as well as other memory banks of a multi-bank memory array). Instructions provided to state machine 1120 are implemented according to control logic configurations, enabling state machine 1120 to manage read, write, erase, data input, data output, and other functionality associated with memory cell array 1102. In some aspects, state machine 1120 can send and receive acknowledgments and negative acknowledgments regarding successful receipt or execution of various commands. In further embodiments, state machine 1120 can decode and implement status-related commands, decode and implement configuration commands, and so on.

To implement read, write, erase, input, output, etc., functionality, state machine 1120 can control clock source(s) 1110 or reference and control signal generator(s) 1118. Control of clock source(s) 1110 can cause output pulses configured to facilitate row controller 1104 and column controller 1106 implementing the particular functionality. Output pulses can be transferred to selected bit lines by column controller 1106, for instance, or word lines by row controller 1104, for instance.

Figure 12:
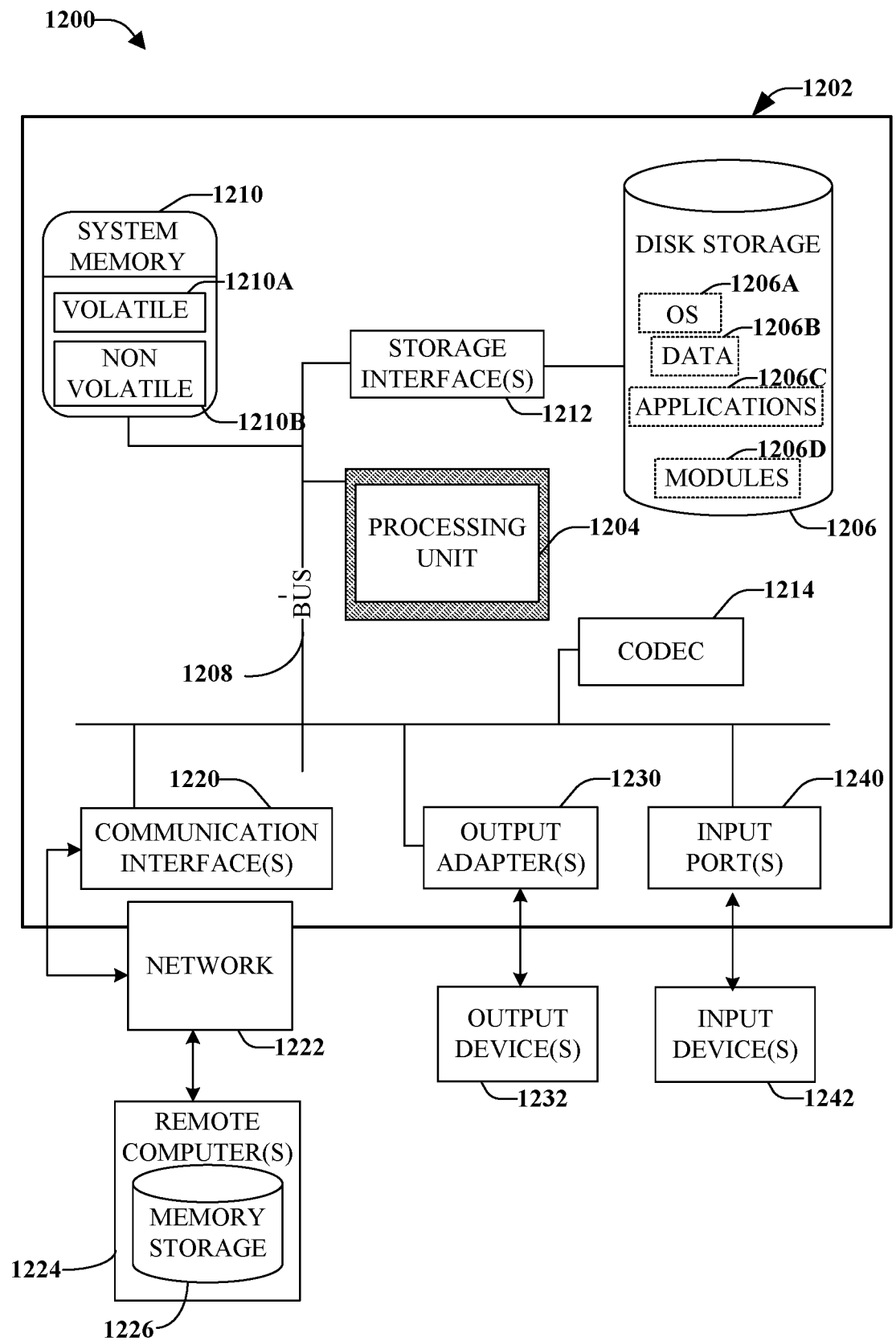
FIG. 12 depicts a block diagram of an example computing environment for implementing one or more embodiments of the present disclosure.

In connection with FIG. 12, the systems, devices, and/or processes described herein can be embodied within hardware, such as a single integrated circuit (IC) chip, multiple ICs, an application specific integrated circuit (ASIC), or the like. Further, the order in which some or all of the process blocks appear in each process should not be deemed limiting. Rather, it should be understood that some of the process blocks can be executed in a variety of orders, not all of which may be explicitly illustrated herein.

With reference to FIG. 12, a suitable environment 1200 for implementing various aspects of the claimed subject matter includes a computer 1202. The computer 1202 includes a processing unit 1204, a system memory 1210, a codec 1214, and a system bus 1208. The system bus 1208 couples system components including, but not limited to, the system memory 1210 to the processing unit 1204. The processing unit 1204 can be any of various available processors. Dual microprocessors and other multiprocessor architectures also can be employed as the processing unit 1204.

The system bus 1208 can be any of several types of bus structure(s) including the memory bus or memory controller, a peripheral bus or external bus, and/or a local bus using any variety of available bus architectures including, but not limited to, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Card Bus, Universal Serial Bus (USB), Advanced Graphics Port (AGP), Personal Computer Memory Card International Association bus (PCMCIA), Firewire (IEEE 1394), Small Computer Systems Interface (SCSI), Compute eXpress Link (CXL), high speed Serial Peripheral Interface (SPI) interfaces (e.g., HyperFlash, and so forth), Inter-Integrated Circuit ($I^2C$) communication protocol, $I^3C$ protocol, etc.

The system memory 1210 includes volatile memory 1210A and non-volatile memory 1210B. The basic input/output system (BIOS), containing the basic routines to transfer information between elements within the computer 1202, such as during start-up, is stored in non-volatile memory 1210B. In addition, according to present innovations, codec 1214 may include at least one of an encoder or decoder, wherein the at least one of an encoder or decoder may consist of hardware, software, or a combination of hardware and software. Although codec 1214 is depicted as a separate component, codec 1214 may be contained within non-volatile memory 1210B. By way of illustration, and not limitation, non-volatile memory 1210B can include read only memory (ROM), programmable ROM (PROM), electrically programmable ROM (EPROM), electrically erasable programmable ROM (EEPROM), or flash memory, two-terminal memory, and so on. Volatile memory 1210A includes random access memory (RAM), and in some embodiments can embody a cache memory. By way of illustration and not limitation, RAM is available in many forms such as static RAM (SRAM), dynamic RAM (DRAM), synchronous DRAM (SDRAM), double data rate SDRAM (DDR SDRAM), and enhanced SDRAM (ES-DRAM).

Computer 1202 may also include removable/non-removable, volatile/non-volatile computer storage medium. FIG. 12 illustrates, for example, disk storage 1206. Disk storage 1206 includes, but is not limited to, devices like a magnetic disk drive, solid state disk (SSD) floppy disk drive, tape drive, Jaz drive, Zip drive, LS-100 drive, flash memory card, or memory stick. In addition, disk storage 1206 can include storage medium separately or in combination with other storage medium including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage devices 1206 to the system bus 1208, a removable or non-removable interface is typically used, such as storage interface 1212. It is appreciated that storage devices 1206 can store information related to a user. Such information might be stored at or provided to a server or to an application running on a user device. In one embodiment, the user can be notified (e.g., by way of output device(s) 1232) of the types of information that are stored to disk storage 1206 or transmitted to the server or application. The user can be provided the opportunity to opt-in or opt-out of having such information collected and/or shared with the server or application (e.g., by way of input from input device(s) 1242).

It is to be appreciated that FIG. 12 describes software that acts as an intermediary between users and the basic computer resources described in the suitable operating environment 1200. Such software includes an operating system 1206A. Operating system 1206A, which can be stored on disk storage 1206, acts to control and allocate resources of the computer system 1202. Applications 1206C take advantage of the management of resources by operating system 1206A through program modules 1206D, and program data 1206D, such as the boot/shutdown transaction table and the like, stored either in system memory 1210 or on disk storage 1206. It is to be appreciated that the claimed subject matter can be implemented with various operating systems or combinations of operating systems.

A user enters commands or information into the computer 1202 through input device(s) 1242. Input devices 1242 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit 1204 through the system bus 1208 via input port(s) 1240. Input port(s) 1240 include, for example, a serial port, a parallel port, a game port, and a universal serial bus (USB). Output device(s) 1232 uses some of the same type of ports as input device(s) 1242. Thus, for example, a USB port may be used to provide input to computer 1202 and to output information from computer 1202 to an output device 1232. Output adapter 1230 is provided to illustrate that there are some output devices 1232 like monitors, speakers, and printers, among other output devices 1232, which require special adapters. The output adapters 1230 include, by way of illustration and not limitation, video and sound cards that provide a means of connection between the output device 1232 and the system bus 1208. It should be noted that other devices and/or systems of devices provide both input and output capabilities such as remote computer(s) 1238.

Computer 1202 can operate in a networked environment using logical connections to one or more remote computers, such as remote computer(s) 1224. The remote computer(s) 1224 can be a personal computer, a server, a router, a network PC, a workstation, a microprocessor based appliance, a peer device, a smart phone, a tablet, or other network node, and typically includes many of the elements described relative to computer 1202. For purposes of brevity, only a memory storage device 1226 is illustrated with remote computer(s) 1224. Remote computer(s) 1224 is logically connected to computer 1202 through a network 1222 and then connected via communication interface(s) 1220. Network 1222 encompasses wire or wireless communication networks such as local-area networks (LAN) and wide-area networks (WAN) and cellular networks. LAN technologies include Fiber Distributed Data Interface (FDDI), Copper Distributed Data Interface (CDDI), Ethernet, Token Ring and the like. WAN technologies include, but are not limited to, point-to-point links, circuit switching networks like Integrated Services Digital Networks (ISDN) and variations thereon, packet switching networks, and Digital Subscriber Lines (DSL).

Communication interface(s) 1220 refers to the hardware/software employed to connect the network 1222 to the bus 1208. While communication interface(s) 1220 is shown for illustrative clarity inside computer 1202, it can also be external to computer 1202. The hardware/software necessary for connection to the network 1222 includes, for exemplary purposes only, internal and external technologies such as, modems including regular telephone grade modems, cable modems and DSL modems, ISDN adapters, and wired and wireless Ethernet cards, hubs, and routers.

The illustrated aspects of the disclosure may also be practiced in distributed computing environments where certain tasks are performed by remote processing devices that are linked through a communications network. In a distributed computing environment, program modules or stored information, instructions, or the like can be located in local or remote memory storage devices.

Moreover, it is to be appreciated that various components described herein can include electrical circuit(s) that can include components and circuitry elements of suitable value in order to implement the embodiments of the subject disclosure. Furthermore, it can be appreciated that many of the various components can be implemented on one or more IC chips. For example, in one embodiment, a set of components can be implemented in a single IC chip. In other embodiments, one or more of respective components are fabricated or implemented on separate IC chips.

In regard to the various functions performed by the above described components, architectures, circuits, processes and the like, the terms (including a reference to a "means") used to describe such components are intended to correspond, unless otherwise indicated, to any component which performs the specified function of the described component (e.g., a functional equivalent), even though not structurally equivalent to the disclosed structure, which performs the function in the herein illustrated exemplary aspects of the embodiments. In this regard, it will also be recognized that the embodiments include a system as well as a computer-readable medium having computer-executable instructions for performing the acts and/or events of the various processes.

In addition, while a particular feature may have been disclosed with respect to only one of several implementations, such feature may be combined with one or more other features of the other implementations as may be desired and advantageous for any given or particular application. Furthermore, to the extent that the terms "includes," and "including" and variants thereof are used in either the detailed description or the claims, these terms are intended to be inclusive in a manner similar to the term "comprising".

As used in this application, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

Further embodiments can be envisioned to one of ordinary skill in the art after reading this disclosure. For example, in various embodiments, erase operations may be initiated upon a plurality of ReRAM devices (e.g., 16, 32, etc.) at the same time.

In other embodiments, combinations or sub-combinations of the above disclosed embodiments can be advantageously made. The block diagrams of the architecture and flow charts are grouped for ease of understanding. However, it should be understood that combinations of blocks, additions of new blocks, re-arrangement of blocks, and the like are contemplated in alternative embodiments of the present disclosure.

It is also understood that the examples and embodiments described herein are for illustrative purposes only and that various modifications or changes in light thereof will be suggested to persons skilled in the art and are to be included within the spirit and purview of this application and scope of the appended claims.

What is claimed is:

1. A method for authenticating a cryptocurrency transaction, comprising:
   forming a short-range only communication link between a secure device and an electronic device, wherein the secure device is embodied exclusively within a monolithic chip formed on a single substrate;
   initiating a multi-party computation (MPC) algorithm with the electronic device and with a server device communicatively connected to the electronic device by way of a second communication link;
   determining a result of the MPC algorithm utilizing a plurality of:
      a first secret input stored within a secure element of the secure device;
      a second secret input supplied by the electronic device over the short-range only communication; or
      a third secret input received from the server device at the electronic device over the second communication link and supplied by the electronic device over the short-range only communication; and
   at least one of:
   activating the cryptocurrency transaction in response to the result of the MPC algorithm being a valid authentication result; or
   rejecting the cryptocurrency transaction in response to the result of the MPC algorithm being an invalid authentication result.

2. The method of claim 1, wherein the MPC algorithm is a N of M threshold algorithm, wherein M defines a total number of inputs to the MPC algorithm and N defines a second number of valid inputs required to produce the valid authentication result as the result of the MPC algorithm, wherein the second number of valid inputs is smaller than the total number of inputs.

3. The method of claim 1, wherein determining the result of the MPC algorithm further comprises:
   providing as inputs to the MPC algorithm, at the secure device, the plurality of: the first secret input, the second secret input or the third secret input;
   executing the MPC algorithm; and
   determining whether the result of the MPC algorithm is the valid authentication result or the invalid authentication result.

4. The method of claim 1, wherein the secure element of the secure device comprises a resistive-switching or magnetic-switching memory array, and the first secret input is stored at the resistive-switching or magnetic-switching memory array of the secure element.

5. The method of claim 1, wherein the MPC algorithm is at least in part a non-standard algorithm or a user compileable algorithm.

6. The method of claim 5, wherein the secure device comprises hardware logic that embodies the MPC algorithm, and wherein determining the result of the MPC algorithm further comprises executing the MPC algorithm at the hardware logic.

7. The method of claim 1, wherein the first secret input or the third secret input is a digital copy of the second secret input supplied by the electronic device.

* * * * *